US011196781B2

(12) United States Patent
Kim et al.

(10) Patent No.: US 11,196,781 B2
(45) Date of Patent: *Dec. 7, 2021

(54) APPLICATION EXECUTION METHOD AND APPARATUS

(71) Applicant: Samsung Electronics Co., Ltd., Suwon-si (KR)

(72) Inventors: Yongjin Kim, Seoul (KR); Kyungah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,016

(22) Filed: Jul. 20, 2018

(65) Prior Publication Data
US 2018/0332085 A1    Nov. 15, 2018

Related U.S. Application Data

(63) Continuation of application No. 14/097,673, filed on Dec. 5, 2013, now Pat. No. 10,033,773.
(Continued)

(30) Foreign Application Priority Data

Apr. 29, 2013    (KR) .................. 10-2013-0047637

(51) Int. Cl.
*H04L 29/06*    (2006.01)
*H04L 29/08*    (2006.01)
(Continued)

(52) U.S. Cl.
CPC ........ *H04L 65/403* (2013.01); *G06F 3/03545* (2013.01); *G06F 3/0488* (2013.01);
(Continued)

(58) Field of Classification Search
CPC ... H04L 65/403; H04L 67/2819; H04L 67/34; H04L 67/1095; G06F 3/0488; G06F 3/03545; G06F 9/485
See application file for complete search history.

(56) References Cited

U.S. PATENT DOCUMENTS 8,224,894 B1    7/2012  Parks et al.
8,775,850 B2 *  7/2014  Moy ................ G09G 5/12
                                                713/400
(Continued)

FOREIGN PATENT DOCUMENTS

EP       1583293 A2     10/2005
JP     2004-265003 A     9/2004
(Continued)

OTHER PUBLICATIONS

Clark, "Live Migration of Virtual Machines", NDSI '05 Technical Program, May 2005.*
(Continued)

*Primary Examiner* — Todd L Barker
(74) *Attorney, Agent, or Firm* — Jefferson IP Law, LLP

(57) ABSTRACT

A method and an apparatus for executing an application are provided. The application execution method of the present disclosure includes connecting a first external device, receiving, from the first external device, connection information for use in connecting to a second external device, connecting to the second external device using the connection information, and transmitting, when a transfer command is received, application execution state information to the second external device. The application execution method of the present disclosure is capable of allowing the user to execute the application conveniently.

15 Claims, 17 Drawing Sheets

Related U.S. Application Data

(60) Provisional application No. 61/735,200, filed on Dec. 10, 2012.

(51) Int. Cl.
    *G06F 9/48*         (2006.01)
    *G06F 3/0354*     (2013.01)
    *G06F 3/0488*     (2013.01)

(52) U.S. Cl.
    CPC .......... *G06F 9/485* (2013.01); *H04L 67/2819* (2013.01); *H04L 67/34* (2013.01); *H04L 67/1095* (2013.01)

(56) References Cited

U.S. PATENT DOCUMENTS

| | | | |
|---|---|---|---|
| 9,265,074 B2* | 2/2016 | Liu | H04W 76/10 |
| 2003/0069503 A1* | 4/2003 | Matsui | A61B 6/563 |
| | | | 600/437 |
| 2004/0003051 A1 | 1/2004 | Kryzanowski et al. | |
| 2004/0162871 A1* | 8/2004 | Pabla | H04W 8/005 |
| | | | 709/201 |
| 2005/0220060 A1 | 10/2005 | Takusagawa et al. | |
| 2006/0212592 A1* | 9/2006 | Gupta | G06F 9/5027 |
| | | | 709/230 |
| 2008/0082641 A1* | 4/2008 | Meijer | G06Q 50/22 |
| | | | 709/220 |
| 2008/0082652 A1* | 4/2008 | Gates | H04L 67/2842 |
| | | | 709/224 |
| 2009/0111453 A1 | 4/2009 | Hsu et al. | |
| 2009/0278842 A1* | 11/2009 | Peterfreund | A63F 13/12 |
| | | | 345/419 |
| 2010/0161744 A1 | 6/2010 | Kim et al. | |
| 2010/0180190 A1* | 7/2010 | Carroll | H04M 11/10 |
| | | | 715/224 |
| 2010/0299455 A1 | 11/2010 | Master et al. | |
| 2010/0306813 A1* | 12/2010 | Perry | A63F 13/86 |
| | | | 725/114 |
| 2011/0052158 A1* | 3/2011 | Baker | H04N 21/84 |
| | | | 386/349 |
| 2011/0250930 A1 | 10/2011 | Jung et al. | |
| 2011/0263332 A1* | 10/2011 | Mizrachi | A63F 13/12 |
| | | | 463/42 |
| 2012/0124128 A1 | 5/2012 | Vonog et al. | |
| 2013/0007499 A1* | 1/2013 | Moy | G06F 3/1423 |
| | | | 713/400 |
| 2013/0065526 A1* | 3/2013 | Pottier | H04W 4/80 |
| | | | 455/41.2 |
| 2013/0222610 A1* | 8/2013 | Brahms | G06F 3/03545 |
| | | | 348/207.1 |
| 2014/0082136 A1* | 3/2014 | Garcia Puga | H04L 29/08981 |
| | | | 709/217 |
| 2014/0157288 A1* | 6/2014 | Wong | G06F 11/3065 |
| | | | 719/318 |
| 2017/0054653 A1* | 2/2017 | Urbach | H04L 67/38 |
| 2017/0220140 A1* | 8/2017 | Black | G06F 3/03545 |

FOREIGN PATENT DOCUMENTS

| | | |
|---|---|---|
| JP | 2005-293240 | 10/2005 |
| JP | 2007-034624 A | 2/2007 |
| KR | 10-2011-0113844 | 10/2011 |
| KR | 10-2011-0134810 A | 12/2011 |
| KR | 10-2012-0049374 | 5/2012 |
| KR | 10-2012-0071792 A | 7/2012 |
| KR | 10-2012-0092725 A | 8/2012 |

OTHER PUBLICATIONS

Schaeffer, "Syzygy: native PC cluster VR", IEEE virtual Reality, 2003, Proceedings, Apr. 2003, IEEE Publishing.*
Korean Notice of Allowance with English translation dated Apr. 14, 2020; Korean Appln. No. 10-2020-0039002.

* cited by examiner

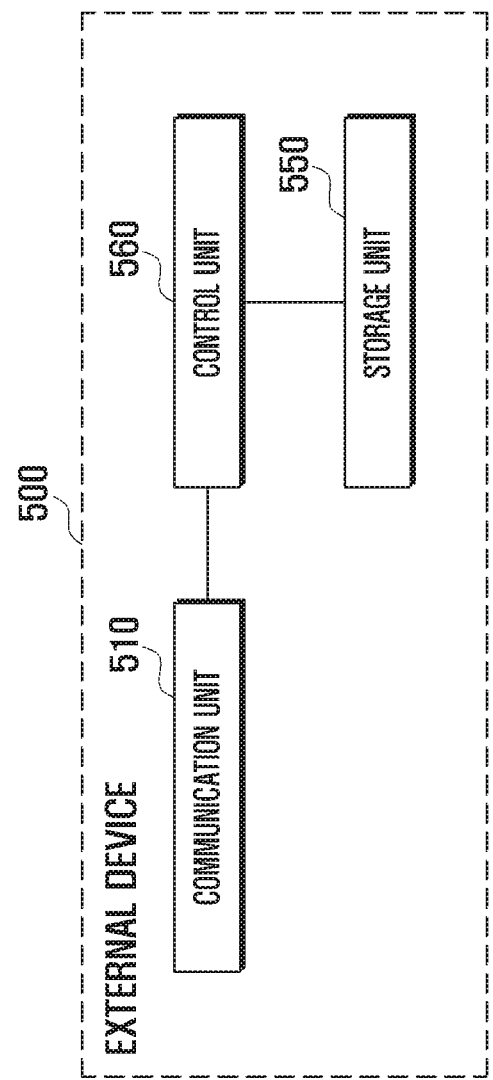

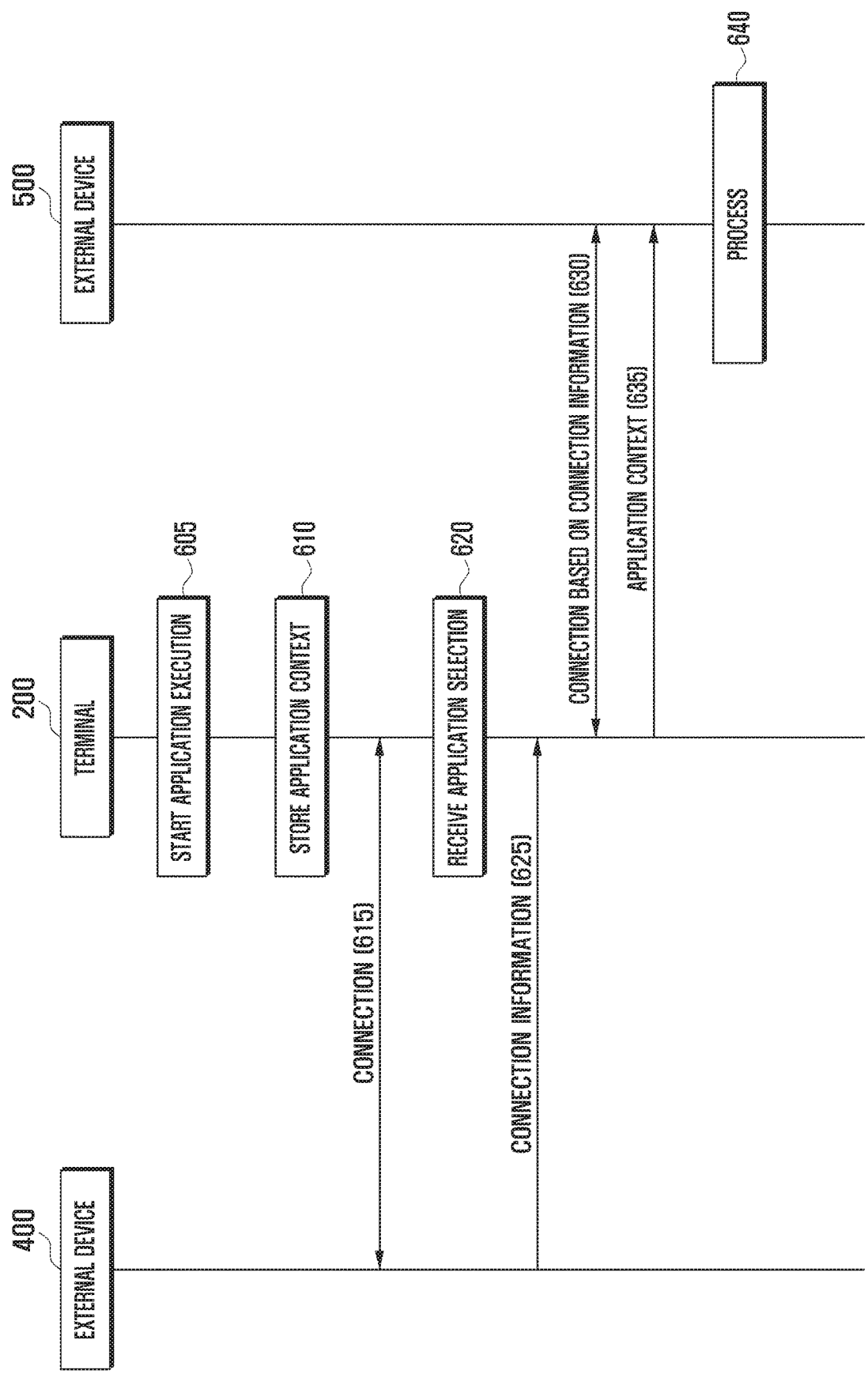

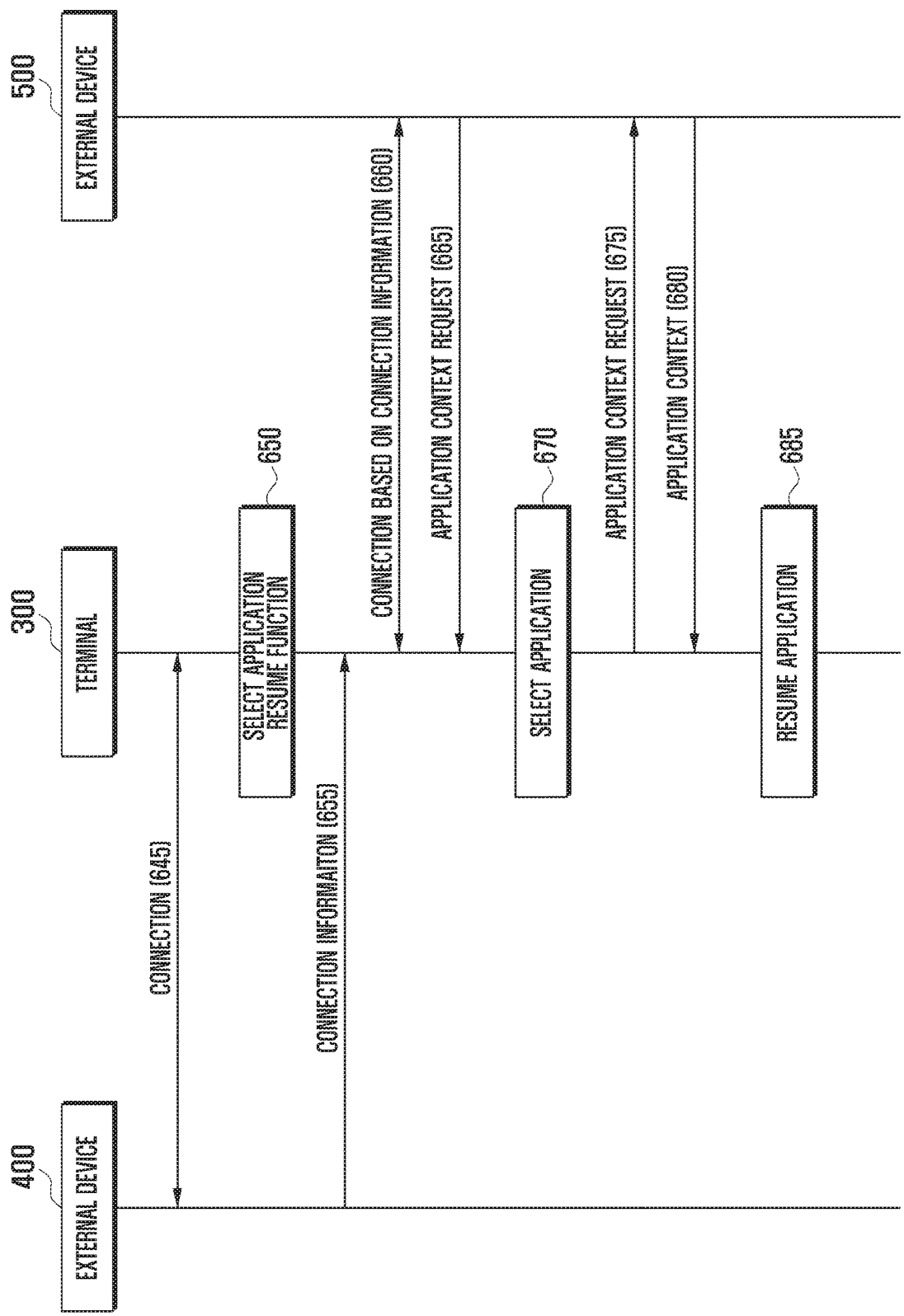

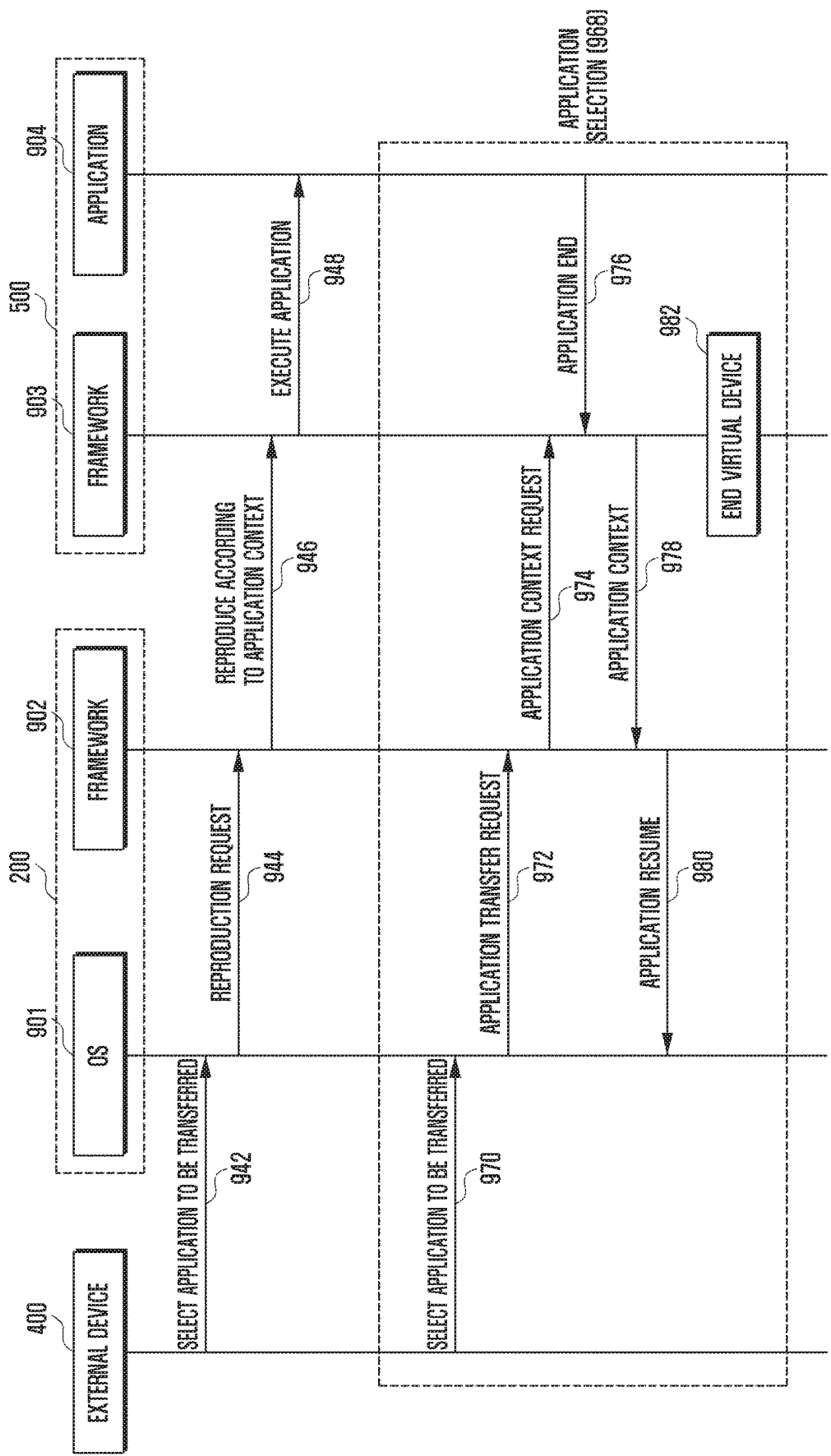

APPLICATION EXECUTION METHOD AND APPARATUS

CROSS-REFERENCE TO RELATED APPLICATION(S)

This application is a continuation application of prior application Ser. No. 14/097,673, filed on Dec. 5, 2013, which claimed the benefit under 35 U.S.C. § 119(e) of a U.S. Provisional application filed on Dec. 10, 2012 in the U.S. Patent and Trademark Office and assigned Ser. No. 61/735,200, and under 35 U.S.C. § 119(a) of a Korean patent application filed on Apr. 29, 2013 in the Korean Intellectual Property Office and assigned Serial No. 10-2013-0047637, the entire disclosures of each of which are hereby incorporated by reference.

TECHNICAL FIELD

The present disclosure relates a method and apparatus for executing an application.

BACKGROUND

Short range communication is a technology relating to non-contact short range radio communication. Bluetooth and Near Field Communication (NFC) are representative short range communication technologies that are widely used. Because short range communication technology can be implemented simply, various devices such as a mobile phone are equipped with a short range communication module.

Meanwhile, a stylus pen is a pen-type screen input tool used in conjunction with a touch screen as a means for inputting user input. For example, the stylus pen may be used in conjunction with a resistive touchscreen. However, as a result of the popularity of capacitive touchscreens, the demand and use of the stylus pen has decreased. However, the stylus pen is useful to make a precise input on the digitizer.

N-screen is a technology aimed to support interoperation among devices handling content. In order to accomplish the goal of facilitating enjoyment of the content including audio, video, and pictures continuously on multiple devices having different specifications, many applications are being developed.

The N-screen technology according to the related art lacks in intuitiveness with large amount of user's input manipulations for establishing content sharing environment among the devices. The N-screen technology according to the related art is also limited to the functions of the applications designated by the device. Consequently, providing the user with an intuitive and seamless experience using N-screen technology according to the related art is difficult.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for executing applications efficiently.

In accordance with an aspect of the present disclosure, a method for executing an application is provided. The method includes connecting a first external device, receiving, from the first external device, connection information for use in connecting to a second external device, connecting to the second external device using the connection information, and transmitting, when a transfer command is received, application execution state information to the second external device.

In accordance with another aspect of the present disclosure, a method for providing connection information of a connection information provision apparatus is provided. The method includes storing the connection information for use in connecting to an external device and transmitting, when connecting to a terminal or when receiving a request for transmitting of the connection information from the terminal, the connection information to the terminal.

In accordance with another aspect of the present disclosure, a method for executing an application is provided. The method includes connecting to a first external device, receiving, from the first external device, connection information for use in connecting to a second external device, connecting to the second external device using the connection information, receiving an application list from one of the first and second external devices, and displaying the received application list.

In accordance with another aspect of the present disclosure, an application execution method is provided. The application execution method includes generating a virtual device, receiving information on an application execution state from a first terminal, resuming execution of the application on the virtual device using the information on the application execution state, and providing, when a request for application execution screen is received from a second terminal, the second terminal with the execution screen of the application running on the virtual device.

In accordance with another aspect of the present disclosure, a terminal for executing an application is provided. The terminal includes a communication unit configured to establish a connection to a first external device, to receive, from the first external device, connection information for use in connecting to a second external device, and to establish a connection to the second external device using the connection information, and an input unit configured to receive a transfer command instructing transfer of the application, wherein the communication unit transmits, when the transfer command is received, application execution state information to the second external device.

In accordance with another aspect of the present disclosure, a connection information provision apparatus is provided. The connection information provision apparatus includes a storage unit configured to store connection information for use in connecting to an external device, and a communication unit configured to transmit, when connecting to a terminal or when receiving a request for transmitting of the connection information from the terminal, the connection information to the terminal.

In accordance with another aspect of the present disclosure, a terminal for executing an application is provided. The terminal includes a communication unit configured to establish a connection to a first external device, to receive, from the first external device, connection information for use in connecting to a second external device, to establish a connection to the second external device using the connection information, and to receive an application list from one of the first and second external devices, and a display unit configured to display the received application list.

In accordance with another aspect of the present disclosure, an application execution apparatus is provided. The application execution apparatus includes a control unit configured to generate a virtual device and a communication unit configured to receive information on an application execution state from a first terminal, wherein the control unit resumes execution of the application on the virtual device using the information on the application execution state, and the communication unit provides, when a request for application execution screen is received from a second terminal, the second terminal with the execution screen of the application running on the virtual device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a block diagram illustrating a configuration of an external device according to an embodiment of the present disclosure;

FIG. 6A is a signal flow diagram illustrating an application transfer procedure of an application execution method according to an embodiment of the present disclosure;

FIG. 6B is a signal flow diagram illustrating an application transfer procedure of an application execution method according to an embodiment of the present disclosure;

FIG. 9C is signal flow diagram illustrating an application transfer procedure of an application execution method according to an embodiment of the present disclosure.

The same reference numerals are used to represent the same elements throughout the drawings.

DETAILED DESCRIPTION

Figure 1:
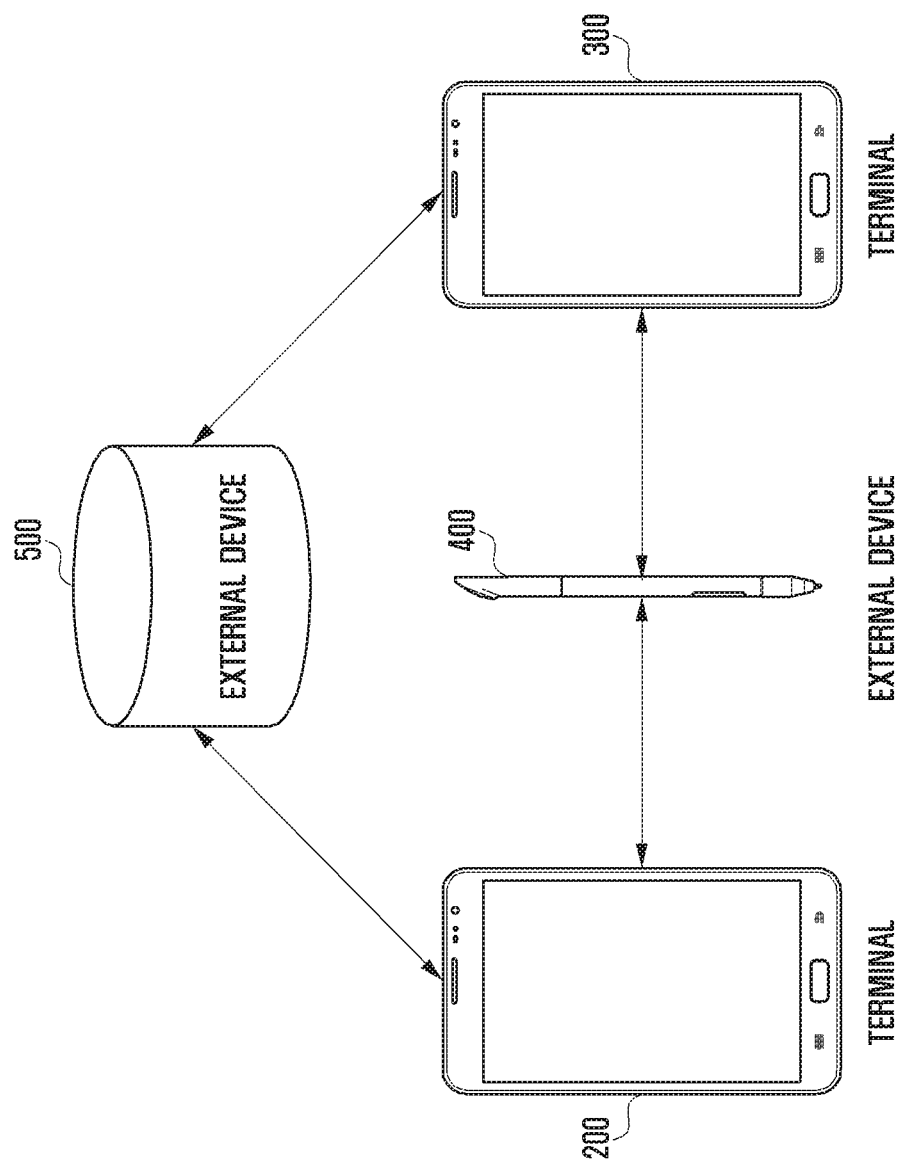
FIG. 1 is a diagram illustrating a network structure of a system of executing and transferring an application according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

FIG. 1 is a diagram illustrating a network structure of a system of executing and transferring an application according to an embodiment of the present disclosure.

Referring to FIG. 1, the system includes terminals 200 and 300, and external devices 400 and 500.

The terminal 200 connects to the external device 400. The connection between the terminal 200 and the external device 400 may be established using a short range communication protocol. The terminal 200 receives connection information from the external device 400. The connection information is the information required for connection to the external device 500. The connection information may include at least one of an Identifier (ID), a password, and a serial number of the external device 400.

The terminal 200 may connect to the external device 500 using the received connection information. The connection between the terminal 200 and the external device 500 may be established through at least one of wired and wireless links. The connection link between the terminal 200 and the external device 500 may be established using at least one of a Long Term Evolution (LTE) protocol, an LTE-Advanced (LTE-a) protocol, a Wideband Code Division Multiple Access (WCDMA) protocol, a Global System for Mobile Communication (GSM) protocol, a Transmission Control Protocol/Internet Protocol (TCP/IP), and the like.

The terminal 200 may be requested to transfer one of the applications running thereon to the external device 500. To transfer an application to the external device 500 may be expressed as "store the application in the external device 500." If a transfer request for transferring the application is received, the terminal 200 sends the external device 500 the information on the application execution state. The application execution state information may include the context of the application. The application context may include at least one of input coordinates, keyboard input information, file Input/Output (I/O), Database (DB) access information, sensor data, and application-related memory state. According to various embodiments of the present disclosure, the application execution state information is capable of reproducing the application execution state of the terminal on another device. In most cases, the execution state is reflected to the memory. Accordingly, the application execution state information transfer procedure can be implemented in such a way of extracting and transferring the application-related memory state to the external device 500. According to various embodiments of the present disclosure, the application execution state information transfer procedure may be implemented in such a way of transferring the memory state capable of reproducing the initial state, coordinates of the input (touch/mouse) after the initial state, and/or the information on the input through a (virtual or physical) keypad to the external device 500.

If the application execution state information is received, the external device 500 stores the information which may be transmitted to another terminal 300 later. According to various embodiments of the present disclosure, the external device 500 generates a virtual device on which the corresponding execution state is reproduced based on the application execution state information. Afterward, the external device 500 transmits the screen of the application execution state to another terminal 300 to process the touch input made on the terminal 300 by means of the virtual device of the external device 500 and transmits the changed application screen to the terminal 300.

The terminal 300 is connected to the external device 400. The connection between the terminal 300 and the external device 400 may be established using a short range communication protocol. The connection information is the information required for connection to the external device 500. The connection information may include at least one of an ID for connection to the external device, a password, an access token, a temporary connection information, and a serial number of the external device 400.

The terminal 300 may connect to the external device 500 using the received connection information. The connection between the terminal 300 and the external device 500 may be established through at least one of wired and wireless links. The connection link between the terminal 200 and the external device 500 may be established using at least one of LTE protocol, LTE-A protocol, WCDMA protocol, GSM protocol, TCP/IP, and the like.

The terminal 300 may receive a list of the applications that can be resumed from the external device 400 and/or the external device 500. The applications that can be resumed may include the application transferred from the terminal 200 to the external device 500. The terminal 300 may receive an input for selecting an application from the list of the application that can be resumed.

According to various embodiments of the present disclosure, the terminal 300 may receive the selected application execution state information from the external device 500. The execution state information may include the memory state related to the corresponding application and input coordinates (of touch or mouse). In this case, the terminal 300 reproduces the corresponding application execution state on the terminal 300 based on the received execution state information to present to the user. If the terminal 300 has the capability of executing the corresponding application and reproducing/resuming the execution state, a method of receiving the selected application execution state information from the external device 500 and reproducing the application execution state on the terminal 300 may be used.

According to various embodiments of the present disclosure, the terminal 300 may receive the execution screen of the selected application from the external device 500. The execution screen may be the execution screen of the application running on the virtual device of the external device 500. The terminal 300 may display the execution screen on the display thereof and transfer the input signal made through the input unit to the external device 400. The external device 500 may process the received input signal as the input of the virtual device. According to various embodiments of the present disclosure, the application execution screen may be transferred from the external device 500 to the terminal 300 in real time, periodically, or whenever the execution is changed.

The external device 400 may retain and/or store the connection information for connection to the external device 500. The external device 400 may provide the terminal 200 and/or the terminal 300 with the connection information. The external device 400 may store the list of the transferred applications. If the application is transferred to the external device 500 as described above, the external device 400 receives the report on the transfer of the application and updates the list of the application based on the report. If the application retained in the external device 400 is transferred to another terminal 300, the external device 400 deletes the corresponding application from the application list thereof.

Referring to FIG. 1, the terminals 200 and 300 are responsible for transmission/reception of the application respectively. However, the terminal 200 may be responsible for the function of the terminal 300 or vice versa. The versions of the Operating System (OS) and applications running on the terminal 200 may be identical with or different from those of the terminal 300.

Descriptions are made of the operations of the terminals 200 and 300 and the external devices 400 and 500 in detail hereinafter with reference to FIGS. 2 to 8.

Figure 2:
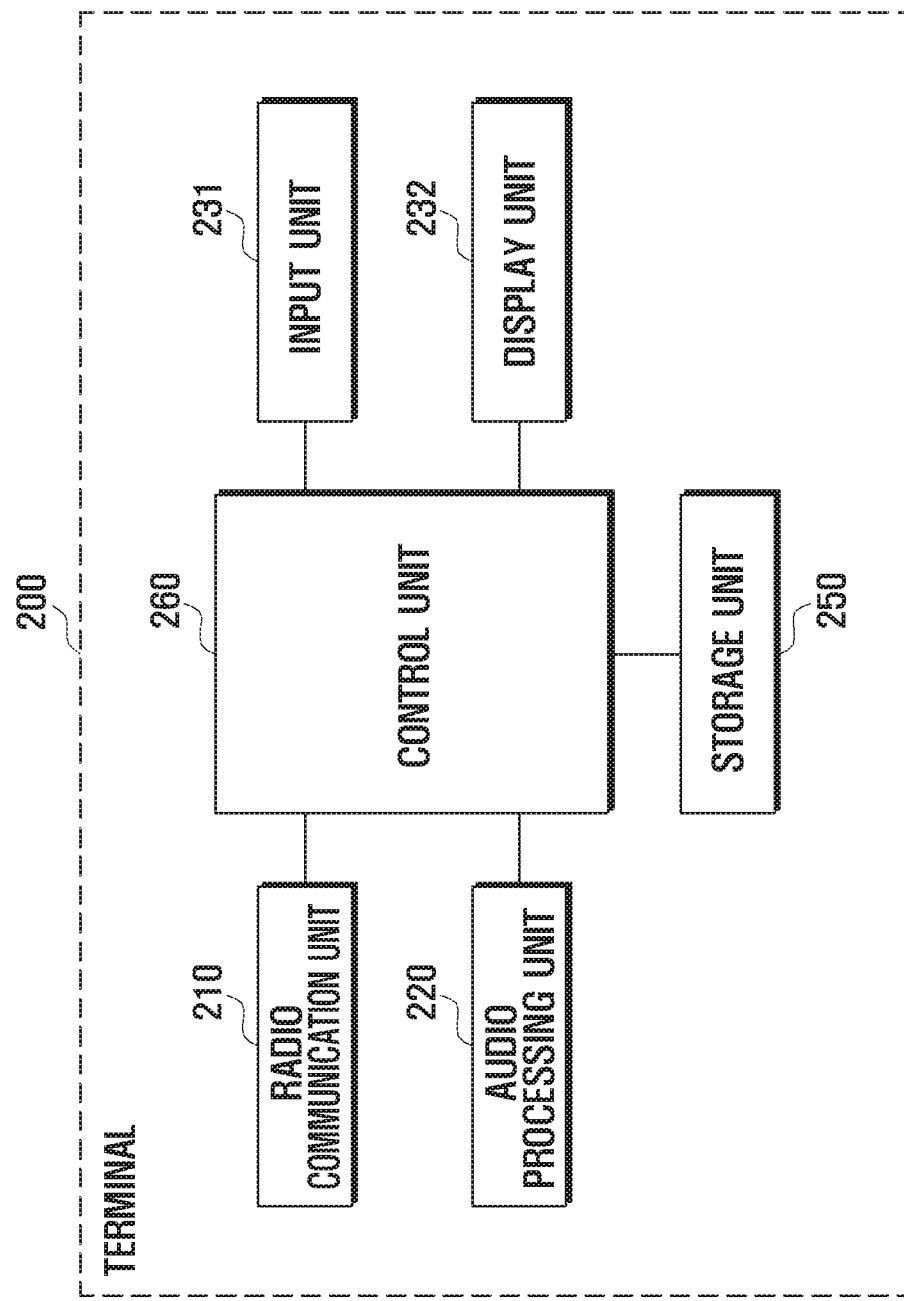
FIG. 2 is a block diagram illustrating a configuration of a terminal according to an embodiment of the present disclosure.

FIG. 2 is a block diagram illustrating a configuration of a terminal according to an embodiment of the present disclosure.

Referring to FIG. 2, the terminal 200 includes a radio communication unit 210, an audio processing unit 220, an input unit 231, a display unit 232, a storage unit 250, and a control unit 260.

The radio communication unit 210 is responsible for transmitting and receiving radio signals carrying data and other signals. The radio communication unit 210 may include a Radio Frequency (RF) transmitter for up-converting and amplifying the transmission signal, an RF receiver for low noise amplifying and down-converting the received signal, and other similar communication modules. The radio communication unit 210 receives a signal through a radio channel and transfers the data carried in the signal to the control unit 260. The radio communication unit 210 may transmit the data output by the control unit 260 through the radio channel. If a wired channel is used for communication, the radio communication unit 210 may be replaced (or supplemented) by a wired communication unit. The wireless radio communication unit and wired communication unit may be referred to integrally as a communication unit.

According to various embodiments of the present disclosure, the radio communication unit 210 may establish a connection to the external device 400 and may receive the connection information required for connection to the external device 500 from the external device 400. The radio communication unit 210 connects the terminal 200 to the external device 500 using the connection information and transmits execution state information of the selected application to the external device 500.

The radio communication unit 210 may use a short range communication technology to establish a connection to the external device 400. For this purpose, the radio communication unit 210 may include a short range communication module. The short range communication module may support the Bluetooth communication, Near Field Communication (NFC), and/or the like.

The audio processing unit 220 converts a digital audio signal to an analog audio signal by means of an audio codec, and outputs the analog audio signal through a Speaker (SPK). The audio processing unit 220 converts the analog audio signal input through a Microphone (MIC) to the digital audio signal by means of the audio codec. The audio processing unit 220 may include a set of codecs. The codecs may include a data codec for processing packet data and an audio codec for processing audio signal including voice. In a system requiring no audio processing, the audio processing unit 220 may be omitted.

The input unit 231 detects a user input and generates a corresponding signal to the control unit 260. The input unit 231 may include a touch sensor and a key input unit.

According to various embodiments of the present disclosure, the touch sensor may detect the user's touch gesture. The touch sensor may be implemented with one of a capacitive overlay sensor, a resistive overlay sensor, an infrared beam sensor, a pressure sensor, and/or the like. The touch sensor also may be implemented with any of all the types of sensors capable of detecting contact of an object or pressure in addition to the aforementioned sensors. The touch sensor detects the user's touch gesture and generates a corresponding input signal to the control unit 260. The detection signal includes the coordinate data on the touch made by the user. If the user moves the touch position, the touch sensor may generate the detection signal including the coordinates on the touch movement path to the control unit 260.

According to various embodiments of the present disclosure, the key input unit receives the input made by user's key manipulation for controlling the terminal 200 and generates corresponding input signal to the control unit 260. The key input unit may be implemented with a keypad including numeral keys and navigation keys and extra function keys formed on one side of the terminal 200. According to various embodiments of the present disclosure, if the terminal is embodied to be controlled with the touch sensor, the key input unit may be omitted.

According to various embodiments of the present disclosure, the key input unit and touch sensor may both be responsible for receiving the user input to generate the corresponding input signal to the control unit 260.

According to various embodiments of the present disclosure, the input unit 231 may detects an input for selecting an application to be transferred to the extra device 500 and generates the selection signal to the control unit 260.

Although the description is directed to the case in which the terminal 200 includes the touch sensor, various embodiments of the present disclosure are not limited thereto but may be applied to the terminal implemented without any touch sensor.

The display unit 232 may provide the user with various information such as menu, input data, function configuration information, and other information. The display unit 232 may be implemented with one of Liquid Crystal Display (LCD), Organic Light Emitting Diodes (OLED), Active Matrix OLED (AMOLED), and the like. The display unit 232 is responsible for displaying a booting screen, a standby screen, a menu screen, a telephony screen, and other application execution screens. According to various embodiments of the present disclosure, the display unit 232 may provide an interface capable of allowing the user to select an application to be transferred to the external device 500.

The storage unit 250 stores programs and data necessary for the operation of the terminal 200. The storage unit 250 may be divided into a program region and a data region. The program region may store the Operating System (OS) for controlling the overall operations of the terminal 200 and booting the terminal 200, application programs necessary for playing multimedia content, and other application programs associated with the optional functions of the terminal 200 such as a camera function, an audio playback function, a still and motion picture playback function, and the like. The data region stores data generated in use of the terminal 200 such as still and motion pictures, phonebook, and audio data. According to various embodiments of the present disclosure, the storage unit 250 may store the connection information received from the external device 400 temporarily or semi-persistently. The connection information may be used for connection to the external device 500 afterward.

The control unit 260 controls overall operations of the components of the terminal 200. The control unit 260 may control the display unit 232 in response to the signal input through the input unit 231.

Figure 3:
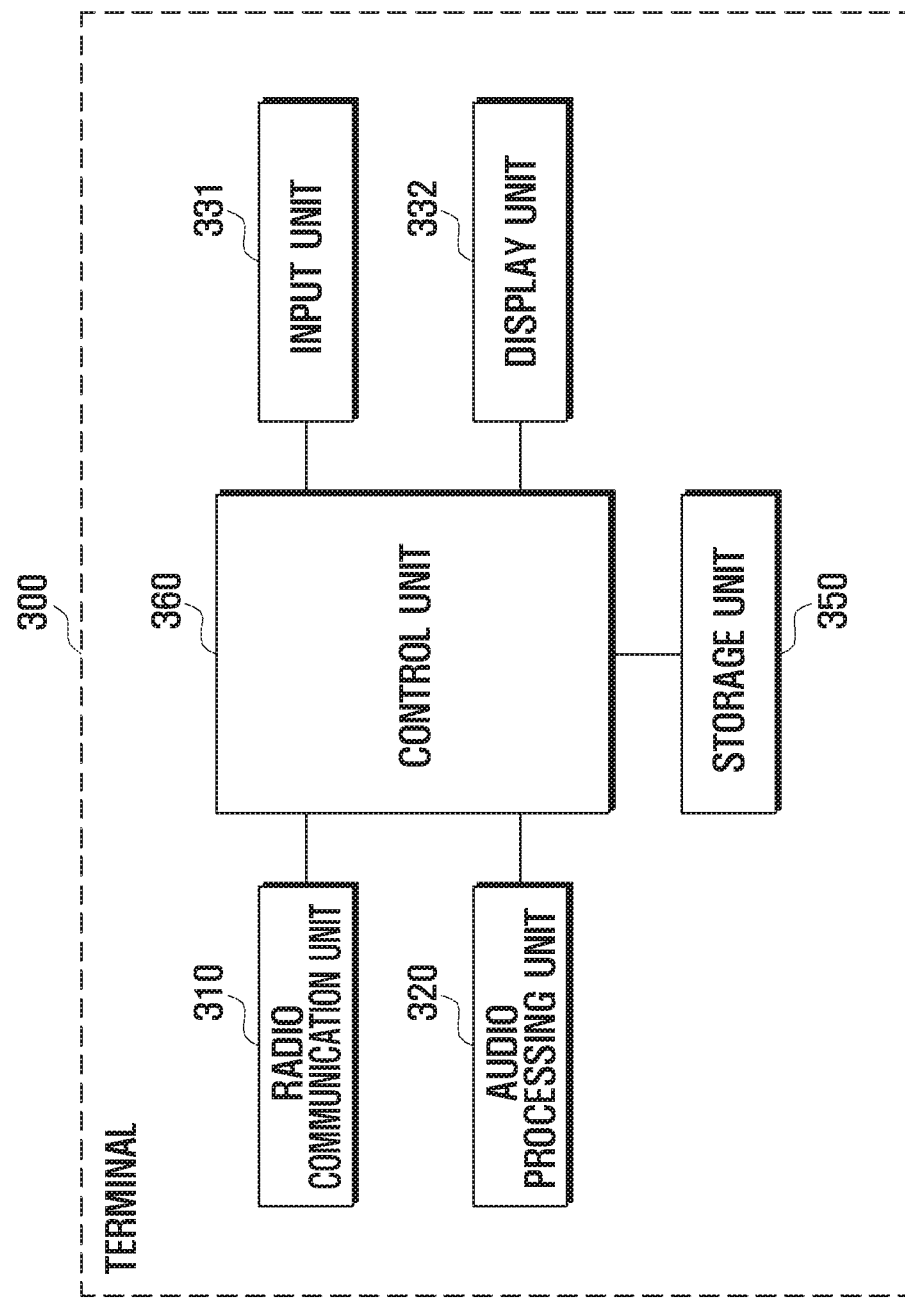
FIG. 3 is a block diagram illustrating a configuration of a terminal according to an embodiment of the present disclosure.

FIG. 3 is a block diagram illustrating a configuration of a terminal according to an embodiment of the present disclosure.

Referring to FIG. 3, the terminal 300 includes a radio communication unit 310, an audio processing unit 320, an input unit 331, a display unit 332, a storage unit 350, and a control unit 360.

The radio communication unit 310 is responsible for transmitting and receiving radio signals carrying data and other signals. The radio communication unit 310 may include a Radio Frequency (RF) transmitter for up-converting and amplifying the transmission signal, an RF receiver for low noise amplifying and down-converting the received signal, and other similar communication modules. The radio communication unit 310 receives a signal through a radio channel and transfers the data carried in the signal to the control unit 360. The radio communication unit 310 may transmit the data output by the control unit 360 through the radio channel. If a wired channel is used for communication, the radio communication unit 310 may be replaced (or supplemented) by a wired communication unit. The wireless radio communication unit and wired communication unit may be referred to integrally as a communication unit.

According to various embodiments of the present disclosure, the radio communication unit 310 may establish a connection to the external device 400 and may receive the connection information required for connection to the external device 500 from the external device 400. The radio communication unit 310 connects the terminal 300 to the external device 500 using the connection information. The radio communication unit 310 may receive a list of applications than can be resumed from the external device 400 and/or the external device 500. If a certain application is selected for resume, the radio communication unit 310 may receive the application execution state information and/or application execution screen from the external device 500.

The radio communication unit 310 may use a short range communication technology to establish a connection to the external device 400. For this purpose, the radio communication unit 310 may include a short range communication module. The short range communication module may support the Bluetooth communication, NFC, and/or the like.

The audio processing unit 320 converts a digital audio signal to an analog audio signal by means of an audio codec, and outputs the analog audio signal through a Speaker (SPK). The audio processing unit 320 converts the analog audio signal input through a Microphone (MIC) to the digital audio signal by means of the audio codec. The audio processing unit 320 may include a set of codecs. The codecs may include a data codec for processing packet data and an audio codec for processing audio signal including voice. In a system requiring no audio processing, the audio processing unit 320 may be omitted.

The input unit 331 detects a user input and generates a corresponding signal to the control unit 360. The input unit 331 may include a touch sensor and/or a key input unit.

According to various embodiments of the present disclosure, the touch sensor may detect the user's touch gesture. The touch sensor may be implemented with one of a capacitive overlay sensor, a resistive overlay sensor, an infrared beam sensor, a pressure sensor, and/or the like. The touch sensor also may be implemented with any of all the types of sensors capable of detecting contact of an object or pressure in addition to the aforementioned sensors. The touch sensor detects the user's touch gesture and generates a corresponding input signal to the control unit 360. The detection signal includes the coordinate data on the touch made by the user. If the user moves the touch position, the touch sensor may generate the detection signal including the coordinates on the touch movement path to the control unit 360.

According to various embodiments of the present disclosure, the key input unit receives the input made by user's key manipulation for controlling the terminal 300 and generates corresponding input signal to the control unit 360. The key input unit may be implemented with a keypad including numeral keys and navigation keys and extra function keys formed on one side of the terminal 300. According to various embodiments of the present disclosure, if the terminal is embodied to be controlled with the touch sensor, the key input unit may be omitted.

According to various embodiments of the present disclosure, the key input unit and touch sensor may both be responsible for receiving the user input to generate the corresponding input signal to the control unit 360.

According to various embodiments of the present disclosure, the input unit 331 may detects an input for selecting an application and generates the selection signal to the control unit 360.

Although the description is directed to the case in which the terminal 300 includes the touch sensor, various embodiments of the present disclosure are not limited thereto but may be applied to the terminal implemented without any touch sensor.

The display unit 332 may provide the user with various informations such as menu, input data, function configuration information, and other information. The display unit 332 may be implemented with one of Liquid Crystal Display (LCD), Organic Light Emitting Diodes (OLED), Active Matrix OLED (AMOLED), and the like. The display unit 332 is responsible for displaying a booting screen, a standby screen, a menu screen, a telephony screen, and other application execution screens. According to various embodiments of the present disclosure, the display unit 332 may provide an interface capable of allowing the user to select an application to be transferred to the external device 500. The display unit 332 also may display the execution screen of the resumed application. At this time, the execution screen may include the execution screen of the application executed at the terminal 300 and/or the execution screen received from the external device 500.

The storage unit 350 stores programs and data necessary for the operation of the terminal 300. The storage unit 350 may be divided into a program region and a data region. The program region may store the Operating System (OS) for controlling the overall operations of the terminal 300 and booting the terminal 300, application programs necessary for playing multimedia content, and other application programs associated with the optional functions of the terminal 300 such as a camera function, an audio playback function, a still and motion picture playback function, and the like. The data region stores data generated in use of the terminal 300 such as still and motion pictures, phonebook, and audio data. According to various embodiments of the present disclosure, the storage unit 350 may store the connection information received from the external device 400 temporarily or semi-persistently. The connection information may be used for connection to the external device 500 afterward.

The control unit 360 controls overall operations of the components of the terminal 300. The control unit 360 may control the display unit 332 in response to the signal input through the input unit 331.

Figure 4:
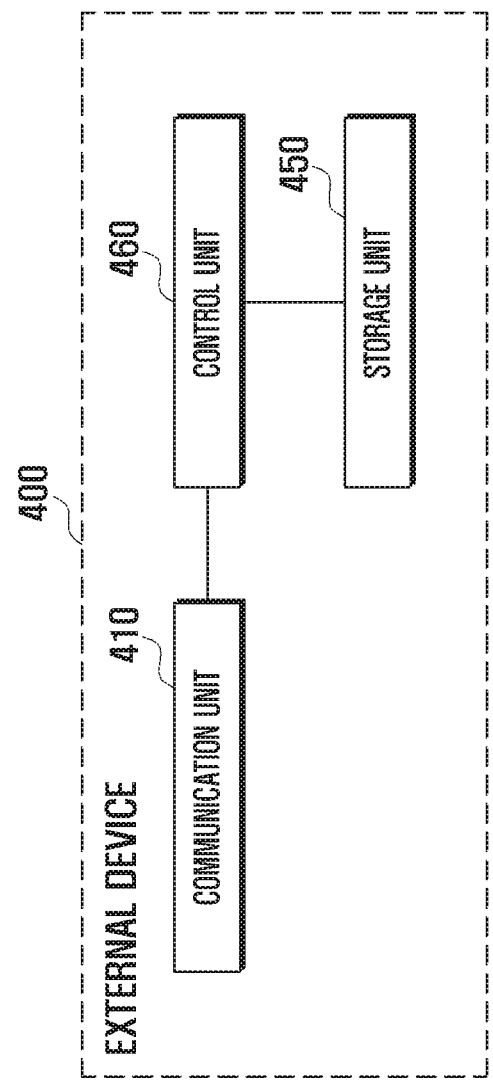
FIG. 4 is a block diagram illustrating a configuration of an external device according to an embodiment of the present disclosure.

FIG. 4 is a block diagram illustrating a configuration of an external device according to an embodiment of the present disclosure.

Referring to FIG. 4, the external device 400 includes a communication unit 410, a storage unit 450, and a control unit 460.

The communication unit 410 connects to the terminal 200 and/or the terminal 300 to transmit connection information to the terminal 200 and/or the terminal 300. The connection information is the information required for the terminal 200 and/or the terminal 300 to connect to the external device 500. For example, if the distance between the external device 400 and the terminal 200 is shorter than a predetermined distance (e.g., a threshold distance) such that the signal strength becomes strong enough to perform the short range communication, the communication unit 410 may connect the external device 400 to the terminal 200 and transmit the connection information to the terminal 200. According to various embodiments of the present disclosure, the communication unit 410 may connect the terminal 200 only when a connection request is received from the terminal 200 and may send the terminal 200 the connection information only when a connection information request. According to various embodiments of the present disclosure, the communication unit 410 may connect the terminal 200 and transmit the connection information to the terminal 200 according to an input made through an electronic/mechanical input unit provided by the external device 400.

The storage unit 450 may store the connection information. The connection information is the information used for connecting the terminal 200 and/or the terminal 300 to the external device 500. For example, the connection information may be information required for connecting the terminal 200 and/or the terminal 300 to the external device 500.

The control unit 460 controls the components of the external device 400 to operating the external device according to at least one of the various embodiments to be described with reference to FIGS. 2, 6A, 6B, 6C, and 8.

According to various embodiments of the present disclosure, the external device 400 may be implemented in the form of a stylus pen. According to various embodiments of the present disclosure, the external device 400 may be a tool having a pointed head (e.g., a sharpened tip), convenient to make a touch input instead of the stylus pen.

The external device 400 may further include an electronic signal generation device and/or an electronic signal detection device to facilitate efficient interaction with the input unit of the terminal 200 and/or the terminal 300.

FIG. 5 is a block diagram illustrating a configuration of an external device according to an embodiment of the present disclosure.

Referring to FIG. 5, the external device 500 includes a communication unit 510, a storage unit 550, and a control unit 560.

The communication unit 510 connects to the terminal 200 and/or the terminal 300 to transmit and receive data to and from the terminal 200 and/or the terminal 300. According to various embodiments of the present disclosure, the communication unit 510 receives the application execution state information from the terminal 200 and sends the application execution state information and/or application execution screen to the terminal 300. The communication unit 510 may receive the input signal transmitted by the terminal 300, and/or the input signal being generated in response to the input to the terminal 300.

The storage unit 550 stores the application execution state information received from the terminal 200.

The control unit 560 controls the components of the external device 500 to operate according to various embodiments of the present disclosure to be described with reference to FIGS. 2, 6A to 6C, and 8. The control unit 560 generates a virtual device corresponding to the terminal 200 and/or the terminal 300 and executes the corresponding application on the virtual device based on the application context information received from the terminal 200. If the input signal corresponding to the application is received from the terminal 300, the control unit 560 applies the corresponding input signal to the virtual device to influence the application execution state.

According to various embodiments of the present disclosure, the external device 500 may be implemented in the form of a cloud server.

The detailed operations of the terminals 200 and 300 and the external devices 400 and 500 are described with reference to FIGS. 6A, 6B, 6C, and 8.

FIG. 6A is a signal flow diagram illustrating an application transfer procedure of an application execution method according to an embodiment of the present disclosure. The procedure of FIG. 6A is applied to other various embodiment of the present disclosure to the described later in the same manner.

FIG. 6B is a signal flow diagram illustrating an application transfer procedure of an application execution method according to an embodiment of the present disclosure.

Figure 6C:
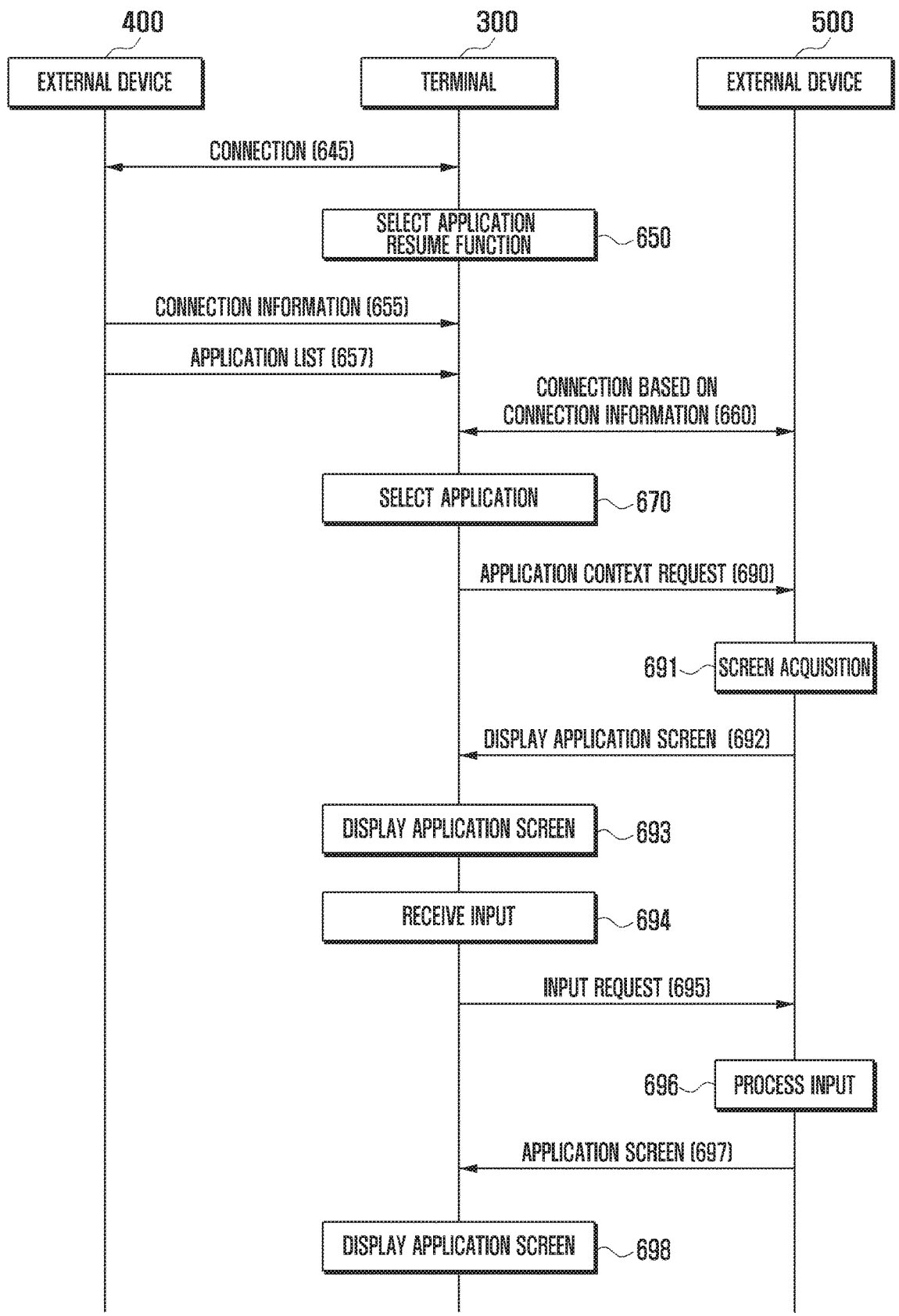
FIG. 6C is a signal flow diagram illustrating an application transfer procedure of an application execution method according to an embodiment of the present disclosure.

FIG. 6C is a signal flow diagram illustrating an application transfer procedure of an application execution method according to an embodiment of the present disclosure.

Referring to FIGS. 6A, 6B, and 6C, the procedures of FIGS. 6B and 6C are performed after the procedure of FIG. 6A.

According to various embodiments of the present disclosure, the terminal 300 and the external devices 400 and 500 may perform the procedure of one of FIGS. 6B and 6C. According to various embodiments of the present disclosure, the terminal 300 and the external devices 400 and 500 may perform the procedures of both FIGS. 6B and 6C.

Referring to FIG. 6A, at operation 605, terminal 200 executes the application. The application may be any of a web browser, a motion picture playback application, game application, and a network service application. The application may be executed in response to an explicit execution command of the user, detection of environmental change of the terminal 200, or according to a predetermined schedule. Any application may be executed automatically at the same time of or after the completion of the boot-up of the terminal 200.

At operation 610, the terminal 200 stores the application context. The terminal 200 may store the application context in real time or at a predetermined interval. The application context may include the information on the signal input for the application. In the case that the terminal 200 is equipped with a touchscreen, the touch coordinates input in the state that the application is activated may be stored. The touch coordinates may be stored repeatedly while the application is running. The application context may further comprise the information on the resolution of the screen. The application context may include the memory state information associated with the application.

According to various embodiments of the present disclosure, the touch coordinates may be omitted in the application context. In this case, the application execution state may be reproduced to a significant extent on the virtual device of the external device 500 only with the memory state.

At operation 615, the terminal 200 and the external device 400 connect to each other. When the external device 400 (e.g., a stylus pen) is in the range of the short range wireless communication, the terminal 200 may establish the short range communication link with the external device 400. According to various embodiments of the present disclosure, the connection operation 615 may be performed only when an application transfer command (instruction) is received at operation 620.

At operation 620, the input unit 231 of the terminal 200 receives an input instructing the transfer of a specific application to an external device 500. The user may instruct to transfer the application to the external device 500 by selecting the application execution screen using the external device 400 or through other methods. According to various embodiments of the present disclosure, the user may input an instruction of selecting the application to be transferred to the external device 500 through the mechanical and/or electrical input unit and select the application execution screen to be transferred to the external device 500 afterward. In this case, the external device 400 may send the terminal 200 the information indicating that the selection made according to the signal input through the mechanical and/or electrical input unit is of selecting the application to be transferred. According to various embodiments of the present disclosure, the user may instruct the transfer of the application to the external device 500 by selecting the application execution screen after the activation of the function selecting the application to be transferred through menu/function selection of the terminal 200.

According to various embodiments of the present disclosure, when the terminal 200 receives an application transfer instruction or the application transfer completes, the application transfer may be notified to the external device 400. The external device 200 has a list of the applications transferred to the external device and, if the corresponding notification is received, updates the application list according to the notification.

FIGS. 7A, 7B, 7C, 7D, and 7E are diagrams illustrating screen displays for explaining a command input reception mechanism of a terminal according to an embodiment of the present disclosure.

Figure 7A:
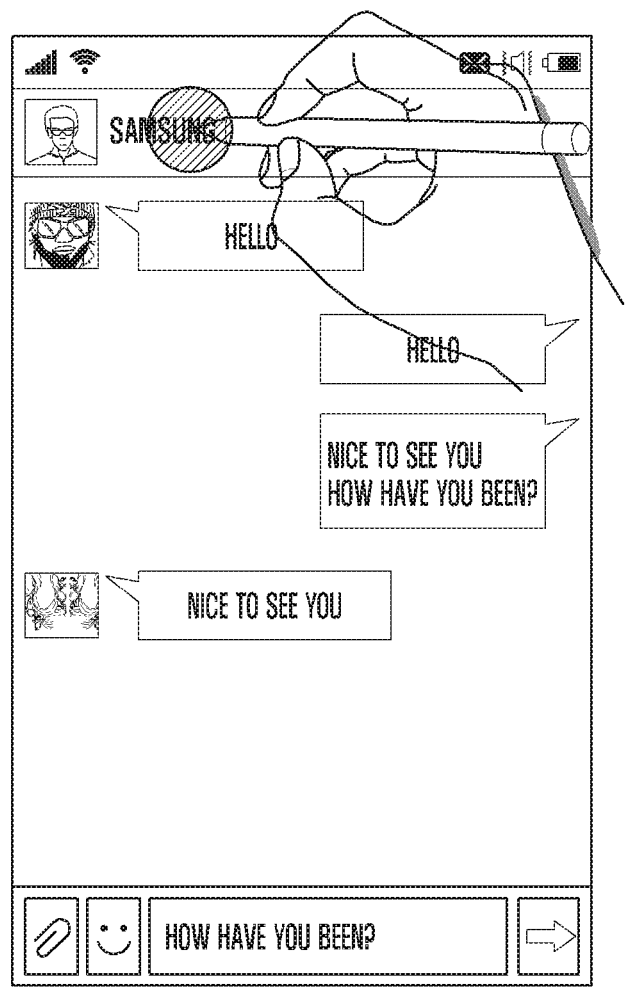
FIGS. 7A, 7B, 7C, 7D, and 7E are diagrams illustrating screen displays for explaining a command input reception mechanism of a terminal according to an embodiment of the present disclosure.

Referring to FIG. 7A, a social network service application is running on the terminal 200. The user may instruct to transfer the social network application to the external device 500 in such a way of selecting a certain position on the screen using the external device 400 or other method.

Figure 7B:
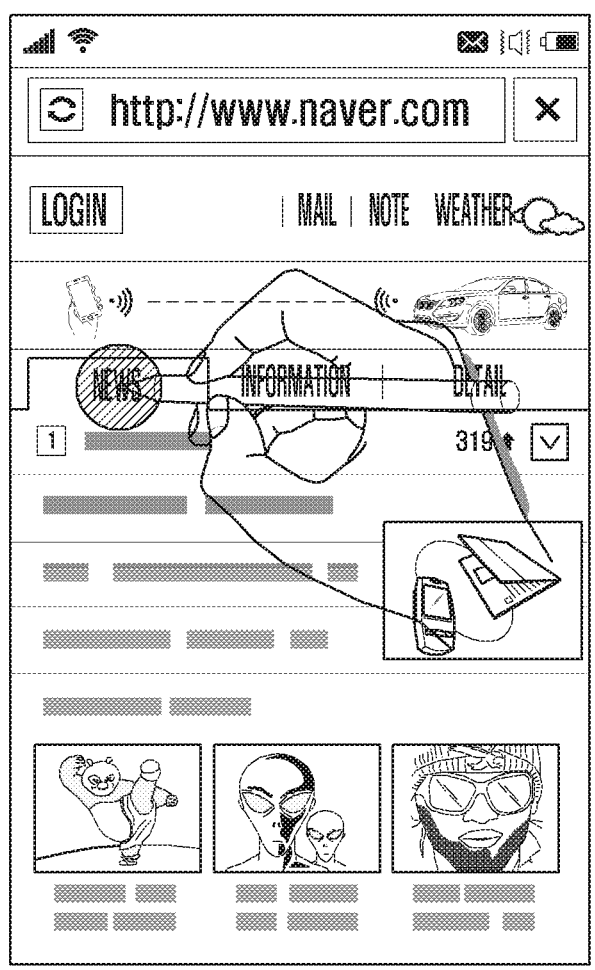

Referring to FIG. 7B, a web browser is running on the terminal 200. The user may instruct to transfer the web browser application to the external device 500 in such a way of selecting a certain position of the web browser screen using the external device 400 or other methods. According to various embodiments of the present disclosure, if a certain tab is selected on the web browser supporting the tab browsing, the terminal 200 may interpret the selection as a command to transfer the execution information of the corresponding tab to the external device 500. In this case, the terminal 200 may transfer the information on the application execution state of the corresponding tab of the web browser execution screen (e.g., webpage address and the coordinate information on the area presented of the entire pages), to the external device 500.

Figure 7C:
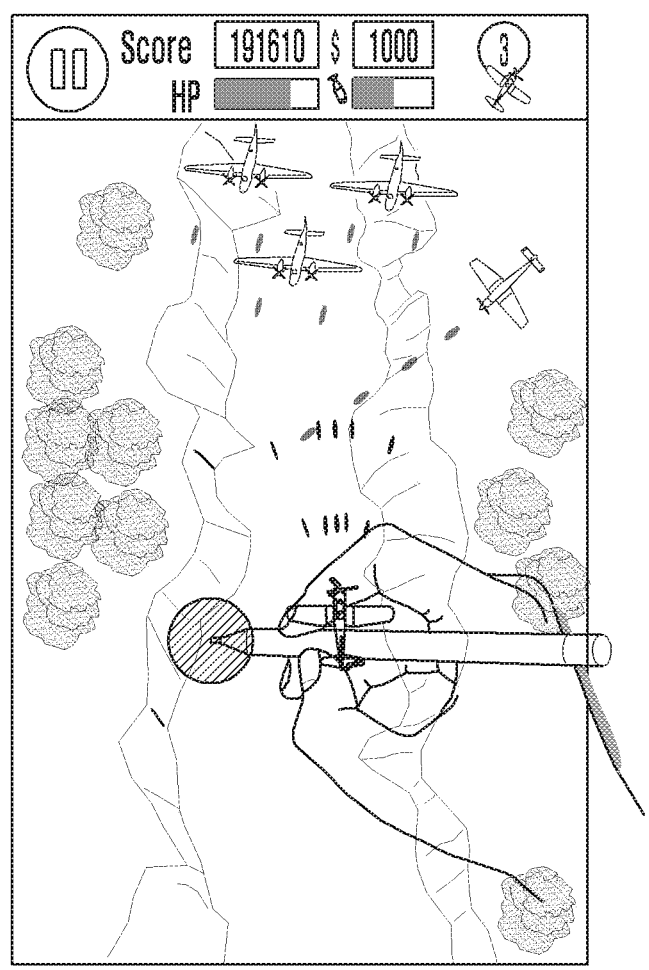

Referring to FIG. 7C, a game application is running on the terminal 200. The user may instruct to transfer the game application to the external device 500 in such a way of selecting a certain position using the external device 400 or other methods.

Figure 7D:
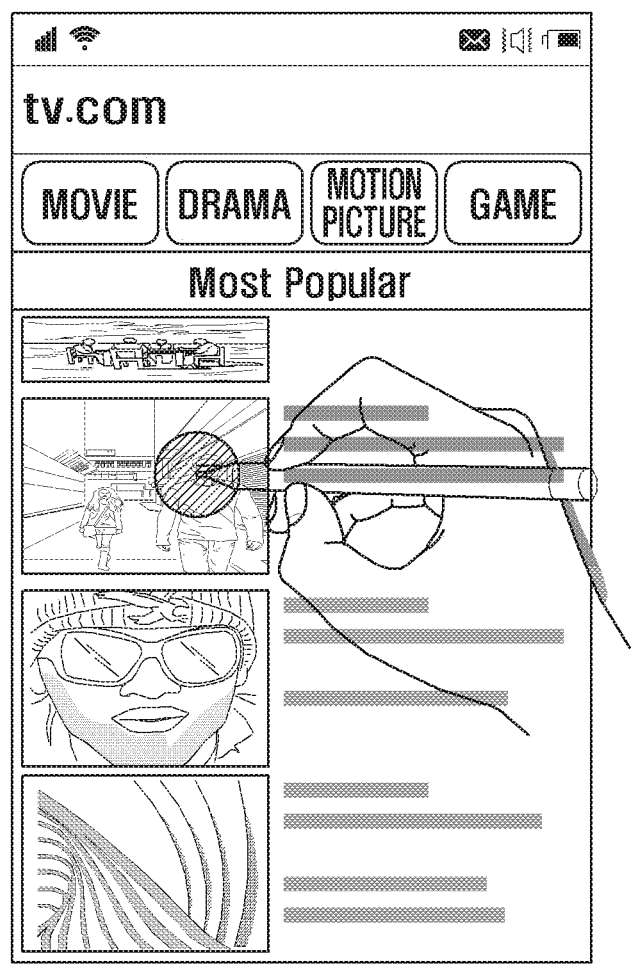

Referring to FIG. 7D, a video application is running on the terminal 200. The user may instruct to transfer the video application to the external device 500 in such a way of selecting a certain position of the screen using the external device 400 or other methods. According to various embodiments of the present disclosure, the user may select an item from a video list and, in this case, the context of the selected video (e.g., motion picture or URL of the page including the motion picture to the external device 500). The external device 500 executes the corresponding video application using the virtual device to play the corresponding motion picture or provide an interface screen capable of playing the motion picture.

Figure 7E:
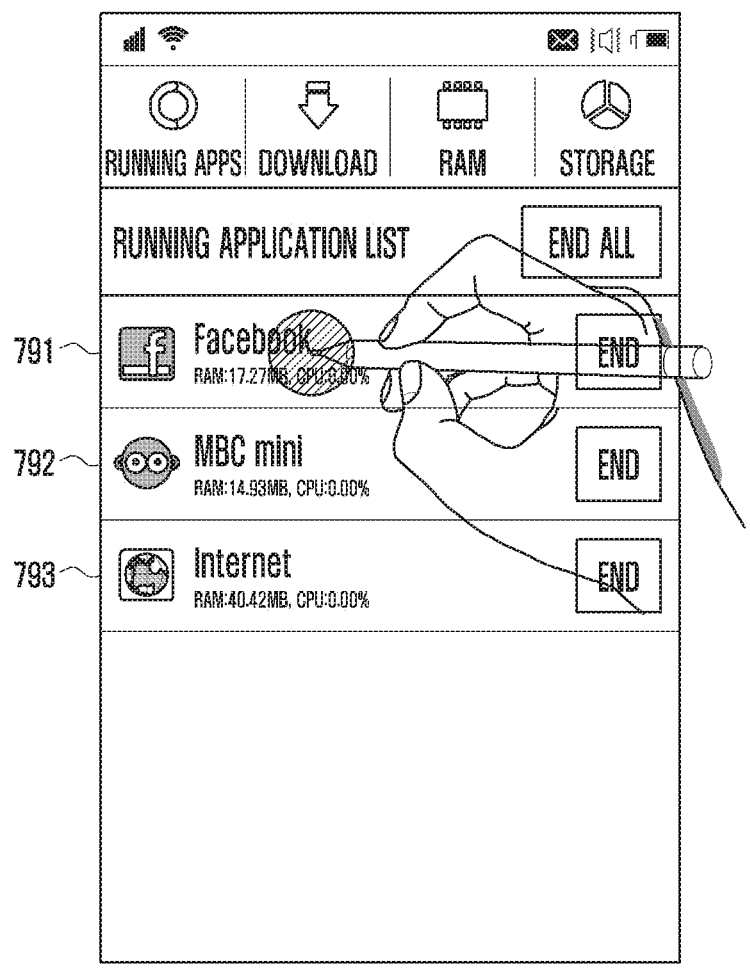

Referring to FIG. 7E, a list of the application items 791, 792, and 793 that are running on the terminal 200 is displayed. The user may select a certain application item to transfer the selected application item to the external device 500.

Returning to FIG. 6A, at operation 625, the terminal 200 receives the connection information from the external device 400. The connection information is the information required for connection to the external device 500. The connection information may include at least one of an Identifier (ID), a password, and a serial number for connection to the external device 500. If an application transfer command is input, the terminal 200 may requests the external device 440 to transmit the connection information. According to various embodiments of the present disclosure, if a connection is established between the external device 400 and the terminal 200 at operation 615, the terminal 200 immediately requests the external device 400 for the connection information.

At operation 630, the terminal 200 connects to the external device 500. For example, at operation 630, the radio communication unit 210 (or communication unit) of the terminal 200 connects to the external device 500 using the connection information at. If the connection information is invalid or the communication state is too bad to establish the connection, the procedure ends with the display of connection failure message.

At operation 635, the terminal 200 sends to the external device 500 the context of the application to be transferred. For example, at operation 635, the radio communication unit 210 of the terminal 200 sends the external device 500 the context of the application to be transferred. The application context may include the memory state information required for reproducing the application execution state. According to various embodiments of the present disclosure, the application context may include the information on the signals input in the state that the application is running on the terminal 200. The application context also may include the information on the resolution of the terminal 200.

At operation 640, the external device 500 processes the received application context. According to various embodiments of the present disclosure, the external device 500 stores the application context and sends the application context to the terminal 300 in response to the request from the terminal 300. According to various embodiments of the present disclosure, the external device 500 may generate a virtual device therein. The external device 500 may execute the corresponding application on the virtual device using the received application context and recover the application execution state of the terminal 200 on the virtual device. If the terminal 300 requests for the application execution screen afterward, the communication unit 510 of the external device 500 provides the terminal 300 repeatedly or whenever the screen is updated.

FIG. 6B shows an application transfer procedure according to an embodiment of the present disclosure. The description is made under the assumption that the procedure of FIG. 6B starts after the procedure of FIG. 6A has completed.

Referring to FIG. 6B, at operation 645, a connection is established between the terminal 300 and the external device 400 at operation 645. The connection process is performed in the similar way to operation 615 of FIG. 6A.

At operation 650, the application resume function is selected in the terminal 300. According to various embodiments of the present disclosure, operation 650 may be omitted.

At operation 655, the external device 400 provides the terminal 300 with the connection information. The connection information is the information required for connection to the external device 500. For example, the connection information may be identical with the connection information described with reference to operation 625 of FIG. 6A.

At operation 660, the terminal 300 connects to the external device 500 using the connection information.

At operation 665, the external device 500 sends to the terminal 300 an application context request.

The terminal 300 receives an application list including the applications capable of being resumed (e.g., the list of the application retained in the external device 500), from the external device 500. Of course, the external device 500 may generate the list of the applications stored therein. According to various embodiments of the present disclosure, the terminal 300 may receive the application list of the external device 500 from the external device 400. In this case, the external device 400 has to receive the information on the transfer of the application from the terminal 200 and maintain the list of the applications transferred to the external device 500.

The terminal 300 may provide the user with the interface allowing the user to select the application to be resumed and receive selection of the application to be resumed.

Figure 8:
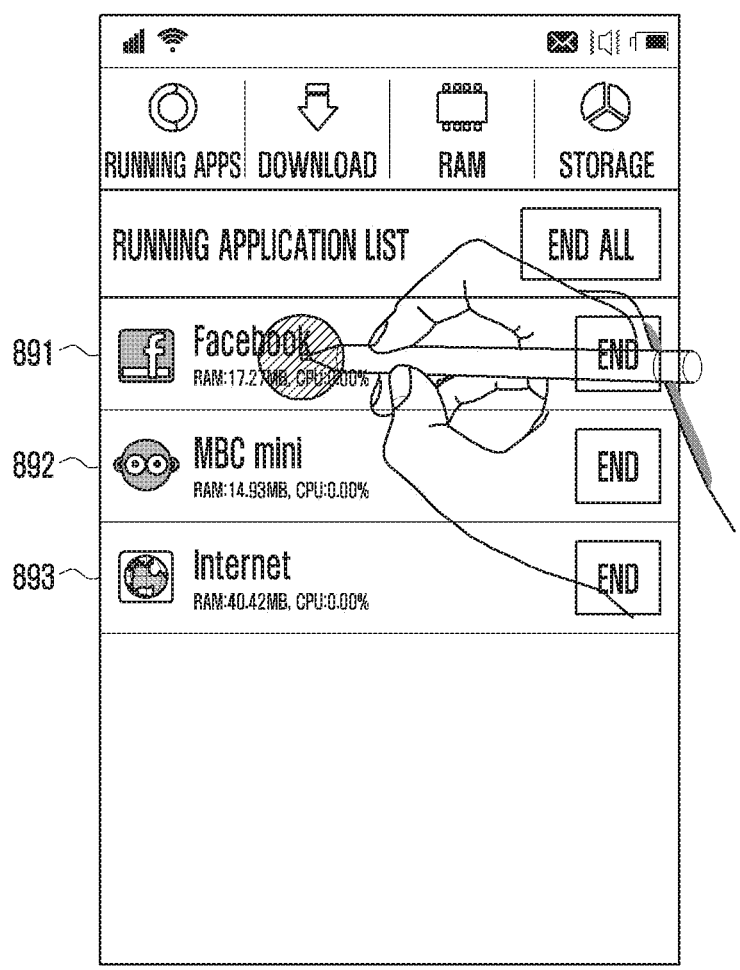
FIG. 8 is a diagram illustrating an application selection interface for use in an application execution method according to an embodiment of the present disclosure.

FIG. 8 is a diagram illustrating an application selection interface for use in an application execution method according to an embodiment of the present disclosure.

Referring to FIG. 8, a list of the applications (e.g., the list of the applications 891, 892, and 893) is transferred to the external device 500.

Referring to FIG. 6B, at operation 670, an application is selected. For example, the user may select one of the applications from the list to resume the selected application at the terminal 300 or display the corresponding application execution screen on the terminal 300.

At operation 675, the terminal 300 sends the external device 500 a message requesting for the context of the selected application.

At operation 680, the external device provides the terminal 300 with the application context. At this time, the external device 500 may send the UE 300 the application context which has been processed or converted to be fit for the resolution or other capability of the terminal 300. As described above, the application context may include the information satisfactory enough to reproduce/resume the corresponding application execution state at the terminal 300.

At operation 685, the control unit 360 of the terminal 300 may resume the application using the received application context.

FIG. 6C shows the application transfer procedure according to an embodiment of the present disclosure.

Because operations 645, 650, and 655 are identical with operations 645, 650, and 655 of FIG. 6B, detailed descriptions thereon are omitted herein.

At operation 657, the terminal 300 receives the list of the applications capable of being resulted at the external device (e.g., the list of the applications transferred to the external device 500). The terminal 300 may receive the transferred application list from the external device 500.

Because operations 660 and 670 are identical with operations 660 and 670 of FIG. 6B, detailed descriptions thereon are omitted herein.

At operation 690, the terminal 300 sends to the external device 500 a request for an application context. For example, at operation 690, the terminal 300 sends the external device 500 a message requesting for the execution screen of the selected application.

At operation 691, the external device 500 acquires the execution screen of the application running on the virtual device.

Upon receipt of the application execution state information in the procedure of FIG. 6A, the external device 500 may generate the virtual device immediately and reproduce/resume the corresponding application on the virtual device.

In contrast, the external device 500 may reproduce/resume the corresponding application on the virtual device when the execution screen of the corresponding application is requested at operation 690. The resolution of the virtual device may be changed depending on the resolution of the terminal 300. The application execution screen request message of operation 690 may further include the resolution information of the terminal 300. Although the virtual device creation time and the application resume time on the virtual device may differ from each other in various embodiments of the present disclosure, the virtual device has to be generated and resume the application before the execution screen is requested.

At operation 692, the external device 500 provides the terminal 300 with the acquired application execution screen.

At operation 693, the terminal 300 displays the received application execution screen. The external device 500 transmits the application execution screen to the terminal in real time, repeatedly, or whenever the screen is changed such that the terminal 300 updates the execution screen.

At operation 694, the terminal 300 receives an input for controlling the application through the input unit 331 in the state of displaying application execution screen. For example, the user receives the execution screen of the application running on the virtual device of the external device 500 by means of the terminal 300 and makes an input for control on the screen.

At operation 695, the terminal sends the external device 500 the received input signal.

At operation 696, the external device 500 processes the received input signal as the input for the application running on the virtual device. The application running on the virtual device may be controlled according to the input signal.

At operation 697, if the application execution screen is changed according to the input signal, the external device 500 transmits the changed execution screen of the application to the terminal 300.

At operation 698, the terminal 300 displays the received application execution screen on the display unit 332 of the terminal 300.

Figure 9A:
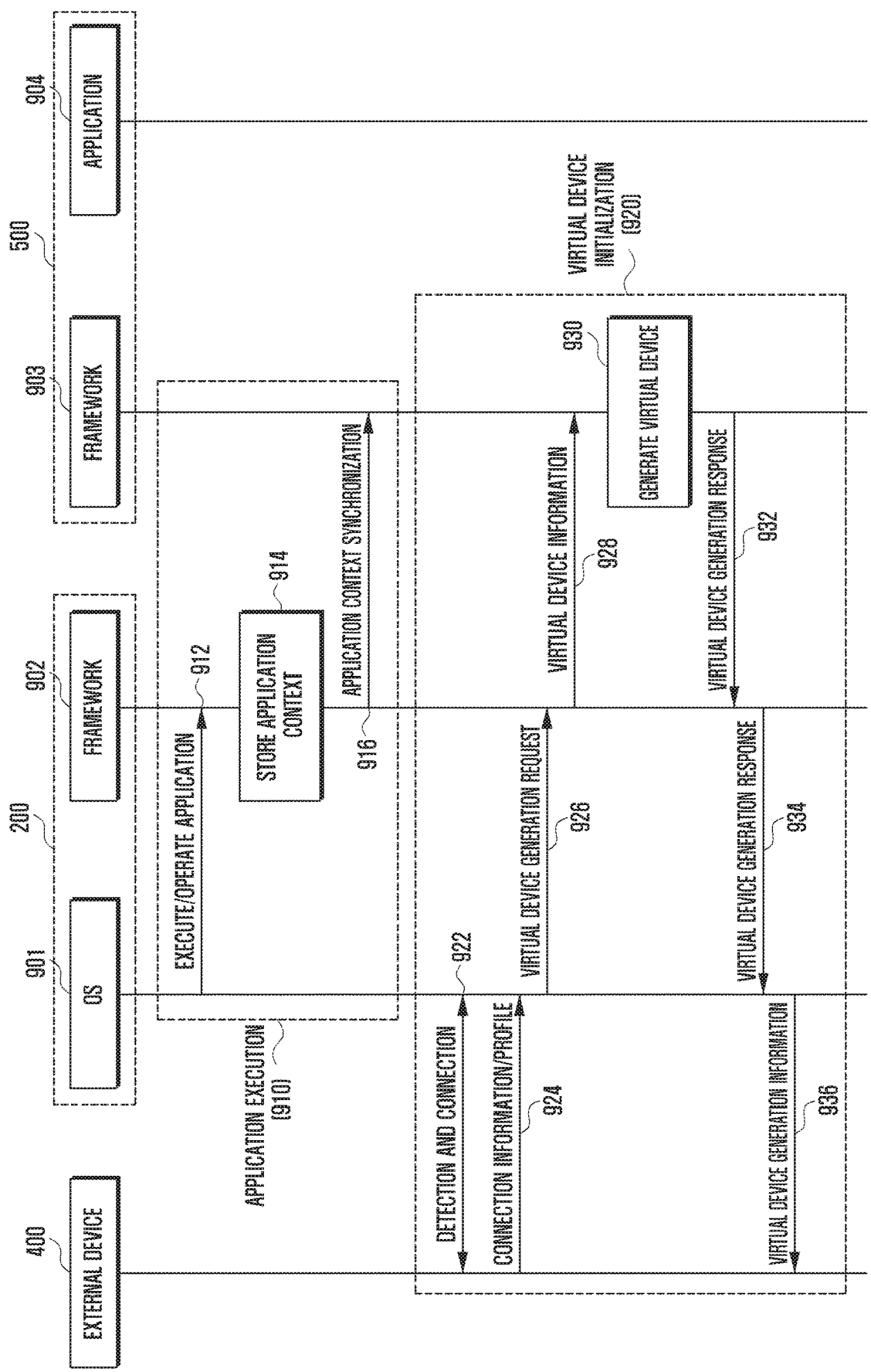
FIGS. 9A and 9B are signal flow diagrams illustrating application transfer procedure of an application execution method according to an embodiment of the present disclosure.
Figure 9B:
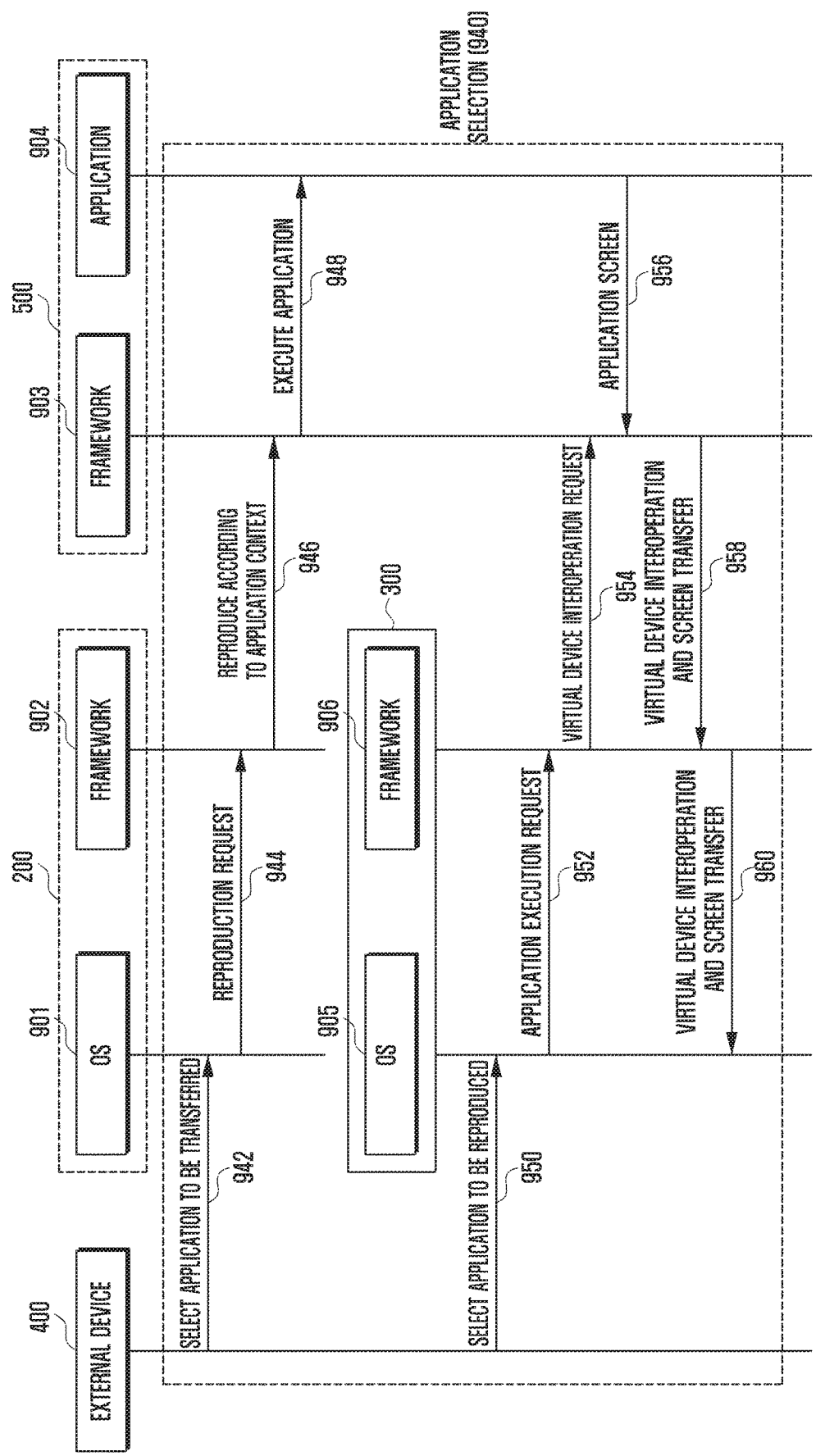

FIGS. 9A and 9B are signal flow diagrams illustrating application transfer procedure of an application execution method according to an embodiment of the present disclosure.

Referring to FIGS. 9A and 9B, a description is made of the configurations of the terminals 200 and 300 and the external device 500 and communication among the internal components or between layers in detail. Certain parts of the procedure of FIGS. 9A and 9B may be combined any parts of the above-described embodiments if possible.

Referring to FIGS. 9A and 9B, the terminal 200 include an OS layer 901 and a framework layer 902. The external device 500 includes a frame work layer 903 and an application layer 904. Referring to FIG. 9B, the terminal 300 includes an OS layer 905 and a framework layer 906.

Referring to FIG. 9A, at operation 910, the application is executed. Operation 910 may include operations 912, 914, and 916.

At operation 912, the OS layer 901 of the terminal 200 sends a command and/or request for executing and operating the application to the framework layer 902.

At operation 914, the framework layer 902 stores the application context in the middle of the execution of the corresponding application. The application context may include at least one of input coordinates, keyboard input information, file Input/Output (I/O), Database (DB) access information, sensor data, and application-specific memory state associated with the corresponding application. The application context may be used for reproducing the corresponding application execution state on the virtual device of the external device 500.

At operation 916, the framework layer 902 of the terminal 200 may synchronize the application context with the framework layer 903 of the external device 500. For example, the framework layer 902 of the terminal 200 may send the framework layer 903 of the external device 500 the application context stored at operation 914 and the framework layer 903 of the external device 500 may store the received application context. The connection between the external device 500 and the terminal 200 is not maintained, the application context synchronization operation 916 may be performed after the connection between the external device 500 and the terminal 200 is established.

At operation 920, the virtual device is initialized. Operation 920 may include operations 922, 9224, 926, 928, 930, 932, 934, and 936.

At operation 922, a connection is established between the external device 400 (e.g., a stylus pen), and the OS layer 901 of the terminal 200. For example, if a short range communication signal of the extra device 400 is detected, the OS 901 of the terminal 200 attempts establishing a short range communication link with the external device 400. According to various embodiments of the present disclosure, if the short range communication signal of the terminal 200, the external device 400 attempts to establish a short range communication link with the terminal 200.

After the connection establishment, at operation 924, the external device 400 sends the OS 901 of the terminal 200 the connection information and/or user profile. The connection information is the information required for connection to the external device 500. If the terminal 200 has already connected to the external device 500, the connection information transmission may be omitted. The user profile may include the information for the external device 500 to identify the external device 400. The user profile may be used for identifying the external device associated with the request received at operations 926, 946, and 954.

At operation 926, the OS layer 901 of the terminal 200 sends the framework layer 902 of the terminal 200 a virtual device creation request. The virtual device creation request may include the connection information and/or profile acquired at operation 924. The virtual device creation request may further include the resolution and other capability of the terminal 200.

At operation 928, the framework layer 902 of the terminal 200 sends the framework layer 903 of the external device 500 the virtual device information. The virtual device information transfer may be interpreted as a request for creating a virtual device. The virtual device information may include at least one of the user profile transmitted at operation 924 and/or the terminal resolution and other capability transmitted at operation 926. If operation 916 is omitted or if any application context is not transmitted, the application context may be transferred at operation 928.

At operation 930, the framework layer 903 of the external device 500 generates the virtual device according to the virtual device information received from the framework 903 of the external device 500. The virtual device is associated with the configuration and performance of the terminal 200.

A virtual device creation response is transmitted from the framework layer 903 of the external device to the OS layer 901 of the terminal 200 via the framework layer 902 of the terminal 200 at operations 932 and 934. For example, at operation 932, the framework layer 903 of the external device 500 transmits a virtual device generation response to the framework layer 902 of the terminal 200. At operation 934, the framework layer 902 of the terminal 200 transmits a virtual device generation response to the OS layer 901 of the terminal 200. The virtual device creation response is the message notifying of the creation of the virtual device in the external device 500. The virtual device creation response may include the information on the resolution and/or other capability of the virtual device.

At operation 936, the OS layer 901 of the terminal 200 sends the external device 400 of the virtual device creation information. The virtual device creation information may include at least one of virtual device creation indicator and resolution and other capability of the virtual device. If there is no need for the external device 400 to acquire the virtual device information, operation 936 may be omitted.

Referring to FIG. 9B, at operation 940, the application selection procedure is performed. The application selection procedure includes operations 942, 944, 946, 948, 950, 952, 954, 956, 958, and 960.

At operation 942, the external device 400 sends the OS 901 of the terminal 200 an input selecting the application to the transferred to the external device 500. The selection input may be made on the touchscreen. The application to be transferred to the external device 500 may be selected in such a way of making a touch on the touchscreen of the terminal 200 or pushing a physical key of the terminal 200 as well as using the external device 400. A user interface as shown in one of FIGS. 7A to 7C is provided for selecting the application.

At operation 944, the OS layer 901 of the terminal 200 sends the framework layer 902 of the terminal 200 a request for reproducing the selected application.

At operation 946, the framework layer 902 of the terminal 200 sends the framework layer 903 of the external device 500 the selected application reproduction request. The selected application reproduction request is the message for requesting the external device 500 to reproduce the corresponding application execution state according to the context of the selected application. If the application context is not transmitted, at operation 946, the corresponding application context may be transmitted from the framework layer 902 of the terminal 200 to the framework layer 903 of the external device 500.

At operation 948, the framework layer 902 of the external device 500 executes the corresponding application on the virtual device of the external device 500 and applies the corresponding application context. For example, the touch input or other input included in the application context is applied to the application running on the virtual device.

At operation 950, the external device 400 sends the OS layer 905 of the terminal 300 the input of selecting the application of which execution screen is to be reproduced on the screen of the terminal 300. The selection input may be made by touching the touchscreen. The application selection input may be made in such a way of touching the touch screen by means of a user's finger or pushing a physical key of the terminal 300 as wells as using the external device 400. For receiving the selection input, the user interface as shown in or similar to FIG. 8 may be provided. The external device 400 and/or the external device 500 may provide the terminal 300 with a list of applications selectable.

Similar to the connection established at operation 922, if the external device moves to approach close to the terminal 300, a short range communication link may be established between the external device 400 and the terminal 300 automatically. Likewise, similar to the information transmission at operation 924, the external device 400 may send the OS layer 905 of the terminal 300 the information required for connection to the external device 500. If the UE 300 has connected to the external device 500 already or if the terminal 300 has the information for use in connecting to the external device 500, there is no need for the OS layer 905 of the terminal 300 to transmit the information for connection to the external device 500.

At operation 952, the OS layer 905 of the terminal 300 sends the framework layer 906 of the terminal 300 a request for executing/reproducing the selected application. The application execution request may be the message commanding the framework layer 906 to transmit a virtual device interoperation request.

At operation 954, the framework layer 906 of the terminal 300 sends the framework layer 903 of the external device 500 a virtual device interoperation request. The virtual device interoperation request may be the message of requesting the external device 500 to output the execution screen of the corresponding application on the virtual device and use the input signal made to the terminal 300 as the input signal for the corresponding application running on the virtual device. The virtual device interoperation request may include the resolution and other capacity information of the terminal 300. In this case, the framework layer 903 of the external device 500 may convert the resolution and other factor of the virtual device to the terminal 300 and process the application screen size and/or other output information to be fit for the resolution and/or other capacity of the terminal 300.

Upon receipt of the virtual device interoperation request, at operation 956, the framework layer 903 of the external device 500 acquires the application execution screen and/or other output (e.g., sound information from the application layer 904.

At operations 958 and 960, the corresponding application screen and/or other output may be transmitted from the framework layer 903 of the external device 500 to the framework layer 906 and OS layer 905 of the terminal 300. For example, at operation 958, the framework layer 903 of the external device 500 may send the virtual device interoperation and screen transfer to the framework layer 906 of the terminal 300. At operation 960, the framework layer 906 of the terminal 300 may send a virtual device interoperation and screen transfer to the OS layer 905 of the terminal 300. The framework layer 903 of the external device 500 may send the terminal 300 the screen information and/or other output of the application periodically or in real time. The terminal 300 may output the received screen information and/or other output data through the display unit or other output components. The signal input through the input unit of the terminal 300 may be transmitted to the external device 500, and the external device 500 may process the input signal as the input to the application running on the virtual device. As a consequence, the application execution state may change on the virtual device and the screen information is transmitted to the terminal 300 in real time or periodically for reflecting the change of the application execution screen.

FIG. 9C is signal flow diagram illustrating an application transfer procedure of an application execution method according to an embodiment of the present disclosure.

The embodiment of the present disclosure illustrated in FIG. 9C may be an alternative method of the various embodiments of the present disclosure illustrated in FIGS. 9A and 9B.

Referring to FIG. 9C, all of the operations 912, 914, 916, 922, 924, 926, 928, 930, 932, 934, and 936 of FIG. 9A may be applied. The procedure of FIG. 9C follows the procedure of FIG. 9A.

Because operations 942, 944, 946, and 948 of FIG. 9C are similar to operations 942, 944, 946, and 948 of FIG. 9B, detailed descriptions thereon are omitted herein.

At operation 968, the terminal 200 receives the application back from the external device 500 at operation 968. Operation 968 may include at least one of operations 970, 972, 974, 976, 978, 980, and 982.

At operation 970, the user may select the application to be transferred from the external device 500 using the external device 400 or other methods. The selection of the application to be transferred may be sent by the external device 400 to the terminal 200.

At operation 972, the OS layer 901 of the terminal 300 requests the framework layer 902 for the transfer of the application.

At operation 974, the framework layer 902 of the terminal 200 requests the framework layer 903 of the external device 500 for the corresponding application context.

Upon received of the application context request, at operation 976, the framework layer 903 of the external device 500 ends the application running on the virtual device of the external device 500.

At operation 978, the framework layer 903 of the external device 500 sends the framework layer 902 of the terminal 200 the corresponding application context.

At operation 980, the framework layer 902 of the terminal requests the OS layer 901 of the terminal 200 to resume the application based on the corresponding application context, and the terminal 200 resumes the application.

At operation 982, the framework layer 903 of the external device 500 ends the virtual device.

In any of the above-described various embodiments of the present disclosure, the terminals 200 and 300 are connected to the external device 400 automatically to receive the connection information for use in connecting to the external device 500. According to various embodiments of the present disclosure, the terminals 200 and 300 may connect to the external device 500 according to the input for connection to the external device 500 of the user regardless of the external device 400.

In any of the above-described various embodiments of the present disclosure, the description is directed to the case in which the screen is presented to the user. If the operation amount required by the application is heavy, however, the operation may be processed by the external device 500. Suppose that an application of the terminal 200 has started encoding a 3-minute long video clip and the video data of 30 seconds has been encoded. At the time that the video data of 30 seconds has been encoded, the terminal transfers the corresponding application to the external device 500. In this case, a part of the encoded video data necessary for encoding the following data and a part of the video data to be encoded may be transferred to the external device 500. According to any of the above-described various embodiments of the present disclosure, the application is transferred to the external device 500. The external device 500 encodes the source video data following the time to which the encoding has been completed (e.g., after 30 seconds from the encoding start time), to generate a part of the video clip. After encoding on the rest video data of 2 minutes and 30 seconds long completely, the external device 500 receives a message requesting to transfer the application back to the terminal 200. In this case, the external device sends the terminal 200 the data associated with the application which includes the video data encoded completely and ends the application. Once the application is transferred back, the terminal 200 may resume encoding the residual part (e.g., the video data of last 30 seconds) to complete the entire source video encoding.

According to various embodiments of the present disclosure, if it is requested to return the application to the terminal 200 after the external device 500 completes encoding the source video data, the external device 500 may transfer the application data including the video file (or packet) as the encoding completion result to the terminal 200.

According to one of the above-described various embodiments of the present disclosure, the user may share the application among a plurality of terminals conveniently while maintaining the application execution state.

The application execution method according to various embodiments of the present disclosure is capable of allowing the user to execute the application conveniently.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the various embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the disclosure and is not intended to be limiting. Because modifications of the disclosed various embodiments incorporating the spirit and substance of the present disclosure may occur to persons skilled in the art, the present disclosure should be construed to include everything within the scope of the appended claims and equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    at least one memory storing a plurality of applications; and
    at least one processor configured to:
        establish a connection between a user terminal and the electronic device,
        transmit a list of the plurality of applications to the user terminal,
        receive, from the user terminal, a request for transmission of first status information of a first application selected from among the plurality of applications,
        based on the request, transmit the first status information related to the first application being executed on the electronic device to the user terminal, wherein the user terminal is configured to:
            display an execution screen of the first application based on the first status information of the first application, and
            receive an input to control the execution screen of the first application,
        receive a control signal for the first application from the user terminal, the control signal including coordinates corresponding to the input to the execution screen being displayed on the user terminal,
        change a state of the first application being executed on the electronic device based on processing the control signal as an input to the first application running in the electronic device, the changed state of the first application including a changed execution screen of the first application, and
        transmit second status information related to the changed state of the first application to the user terminal, wherein the user terminal is further configured to display the changed execution screen of the first application based on the second status information,
        wherein the electronic device generates a virtual device to manage the changed state of the first application and provide the changed state of the first application to the use terminal, and
        wherein when the first application of the plurality of applications retained in an external device is transferred to another user terminal, the external device deletes the first application from the list of the plurality of applications.

2. The electronic device of claim 1, wherein the control signal for the first application comprises a signal for resuming execution of the first application.

3. The electronic device of claim 1, wherein the plurality of applications includes at least one of a web browser, a motion picture playback application, a game application, or a network service application.

4. The electronic device of claim 1, wherein the plurality of applications is capable of being executed in the user terminal.

5. A method comprising:
    establishing a connection between a user terminal and an electronic device;
    transmitting, by the electronic device, a list of a plurality of applications to the user terminal;
    receiving, by the electronic device, a request for transmission of first status information of a first application selected from among the plurality of applications;
    based on the request, transmitting, by the electronic device, the first status information related to the first application being executed on the electronic device to the user terminal, wherein the user terminal is configured to:
        display an execution screen of the first application based on the first status information of the first application, and
        receive an input to control the execution screen of the first application;
    receiving, by the electronic device, a control signal for the first application from the user terminal, the control signal including coordinates corresponding to the input to the execution screen being displayed on the user terminal;

changing, by the electronic device, a state of the first application being executed on the electronic device based on processing the control signal as an input to the first application running in the electronic device, the changed state of the first application including a changed execution screen of the first application; and transmitting, by the electronic device, second status information related to the changed state of the first application to the user terminal, wherein the user terminal is further configured to display the changed execution screen of the first application based on the second status information, wherein the electronic device generates a virtual device to manage the changed state of the first application and provide the changed state of the first application to the use terminal, and wherein when the first application of the plurality of applications retained in an external device is transferred to another user terminal, the external device deletes the first application from the list of the plurality of applications.

6. The method of claim 5, wherein the control signal for the first application comprises a signal for resuming execution of the first application.

7. The method of claim 5, wherein the plurality of applications includes at least one of a web browser, a motion picture playback application, a game application, or a network service application.

8. The method of claim 5, wherein the plurality of applications is capable of being executed in the user terminal.

9. A non-transitory computer-readable medium having stored thereon instructions that, when executed by at least one processor of an electronic device, causing the electronic device to perform a method, the method comprising:

establishing a connection between a user terminal and the electronic device;

transmitting, by the electronic device, a list of a plurality of applications stored in the electronic device to the user terminal;

receiving, by the electronic device, a request for transmission of first status information of a first application selected from among the plurality of applications;

based on the request, transmitting, by the electronic device, the first status information related to the first application being executed on the electronic device to the user terminal, wherein the user terminal is configured to:

display an execution screen of the first application based on the first status information of the first application, and receive an input to control the execution screen of the first application;

receiving, by the electronic device, a control signal for the first application from the user terminal, the control signal including coordinates corresponding to the input on the execution screen being displayed on the user terminal;

changing, by the electronic device, a state of the first application being executed on the electronic device based on processing the control signal as an input to the first application running in the electronic device, the changed state of the first application including a changed execution screen of the first application; and transmitting, by the electronic device, second status information related to the changed state of the first application to the user terminal, wherein the user terminal is further configured to display the changed execution screen of the first application based on the second status information, wherein the electronic device generates a virtual device to manage the changed state of the first application and provide the changed state of the first application to the use terminal, and wherein when the first application of the plurality of applications retained in an external device is transferred to another user terminal, the external device deletes the first application from the list of the plurality of applications.

10. The non-transitory computer-readable medium of claim 9, wherein the control signal for the first application comprises a signal for resuming execution of the first application.

11. The non-transitory computer-readable medium of claim 9, wherein the plurality of applications includes at least one of a web browser, a motion picture playback application, a game application, or a network service application.

12. The non-transitory computer-readable medium of claim 9, wherein the plurality of applications is capable of being executed in the user terminal.

13. The electronic device of claim 1, wherein the control signal for the first application comprises memory information of the user terminal related to the state of the first application.

14. The method of claim 5, wherein the control signal for the first application comprises memory information of the user terminal related to the state of the first application.

15. The non-transitory computer-readable medium of claim 9, wherein the control signal for the first application comprises memory information of the user terminal related to the state of the first application.

* * * * *